Oct. 3, 1933.        R. N. FALGE ET AL         1,929,111
                      AUTOMOBILE HEAD LAMP
                  Filed May 23, 1931    18 Sheets-Sheet 1
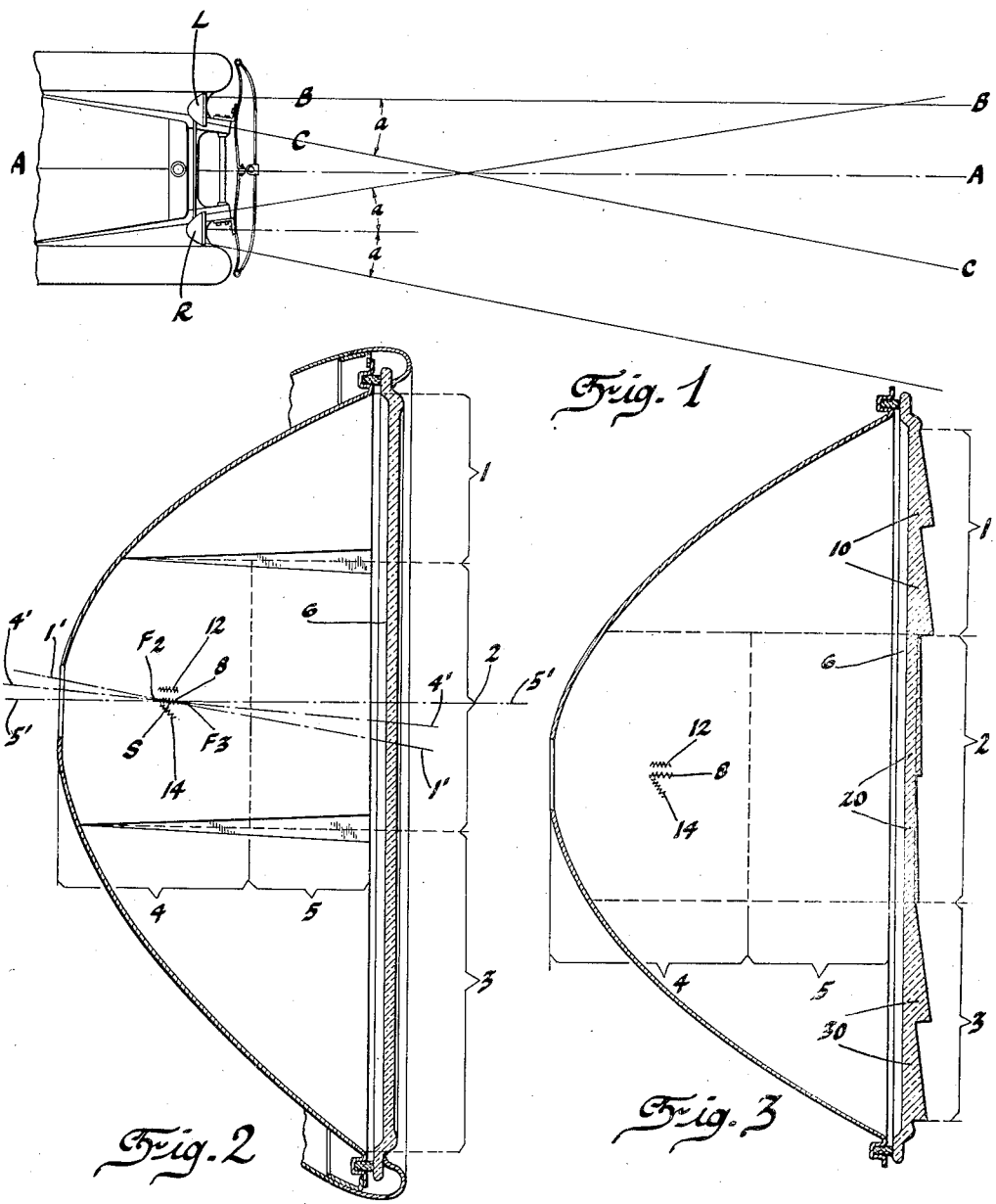

Oct. 3, 1933.    R. N. FALGE ET AL    1,929,111
AUTOMOBILE HEAD LAMP
Filed May 23, 1931    18 Sheets-Sheet 2

Inventors
Robert N. Falge
& Charles E. Godley
By Blackmore, Spencer & Fluih
Attorneys Oct. 3, 1933. R. N. FALGE ET AL 1,929,111
AUTOMOBILE HEAD LAMP
Filed May 23, 1931 18 Sheets-Sheet 3

Inventors
Robert N. Falge
& Charles E. Godley
By Blackmore, Spencer, & Hitch
Attorneys Oct. 3, 1933.  R. N. FALGE ET AL  1,929,111
AUTOMOBILE HEAD LAMP
Filed May 23, 1931   18 Sheets-Sheet 4

Inventors
Robert N. Falge
& Charles E. Godley
By Blackmore, Spencer & Hulit
Attorneys

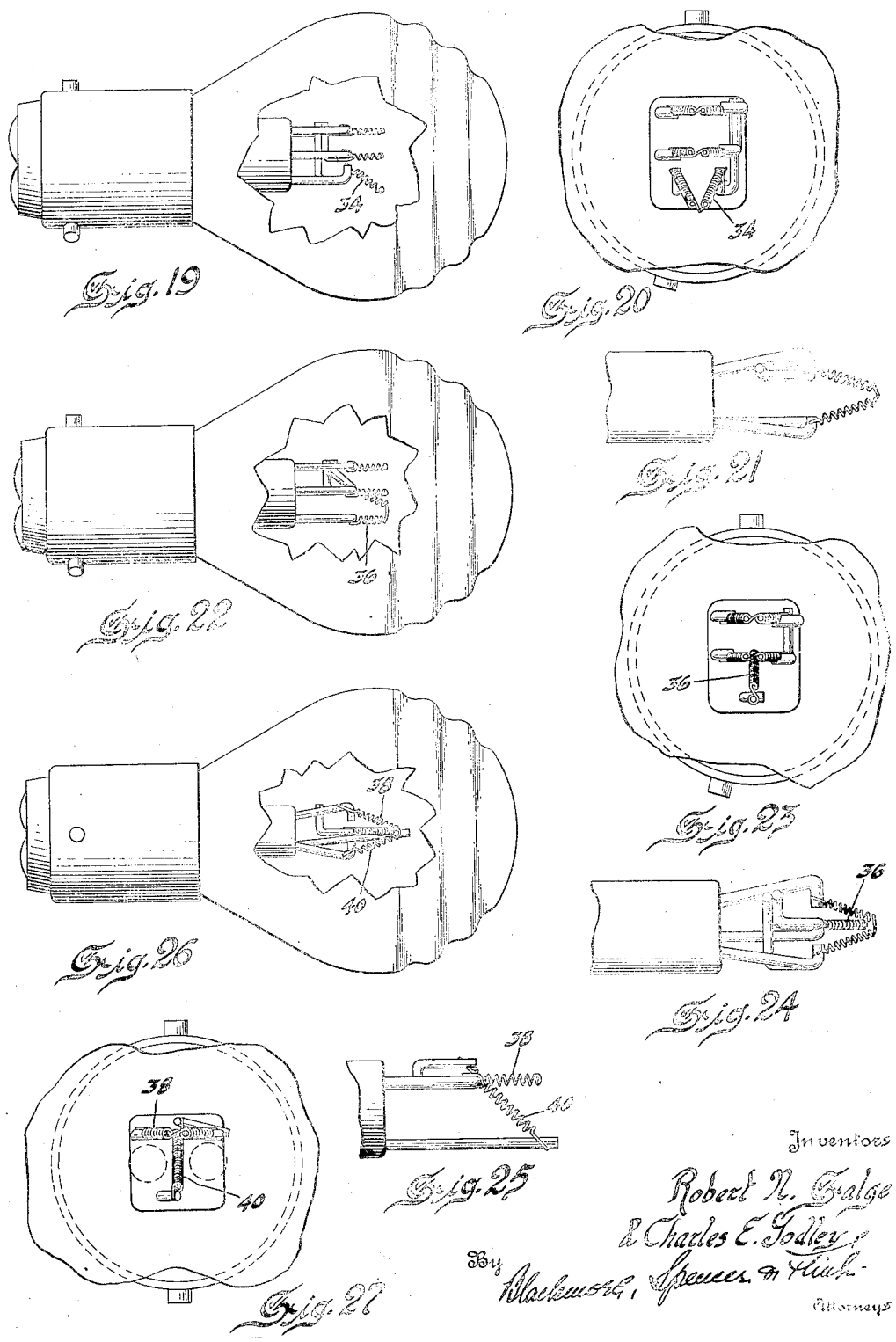

Oct. 3, 1933.   R. N. FALGE ET AL   1,929,111
AUTOMOBILE HEAD LAMP
Filed May 23, 1931   18 Sheets-Sheet 6

Inventors
Robert N. Falge
& Charles E. Godley
By Blackmore, Spencer & Hath
Attorneys

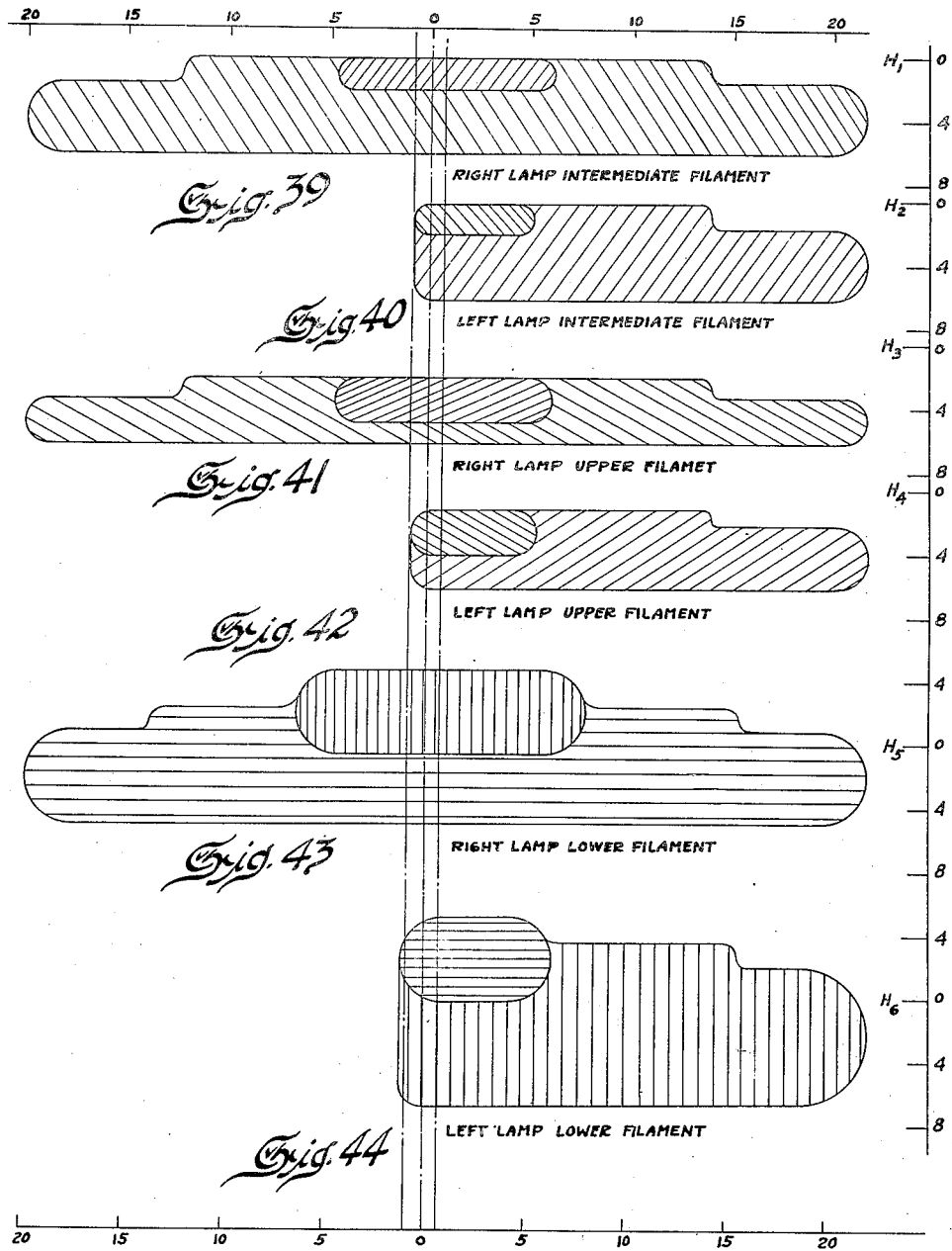

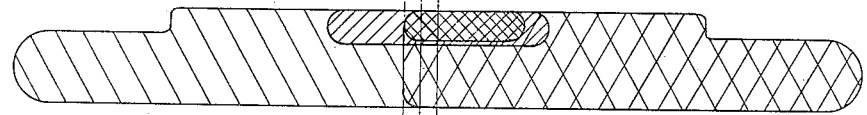

Fig. 45 — CITY UPPER BEAM PATTERN
INTERMEDIATE FILAMENTS

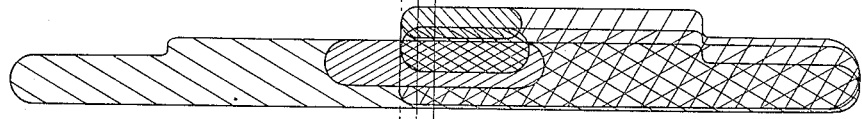

Fig. 46 — COUNTRY LOWER BEAM PATTERN
UPPER FILAMENTS AND
INTERMEDIATE FIL. OF LEFT LAMP

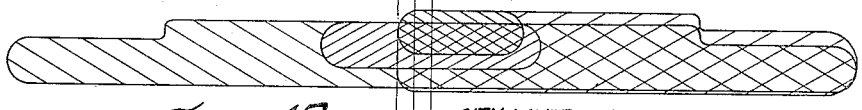

Fig. 47 — CITY LOWER BEAM PATTERN
UPPER FILAMENTS

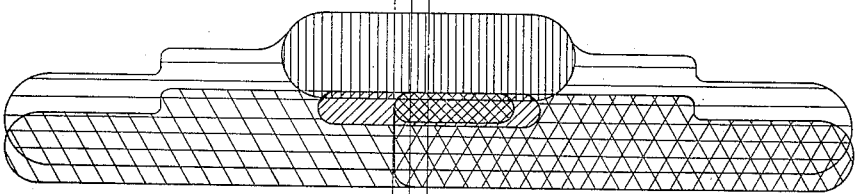

Fig. 48 — COUNTRY UPPER BEAM PATTERN
INTERMEDIATE FILAMENTS AND
LOWER FIL. OF RIGHT LAMP

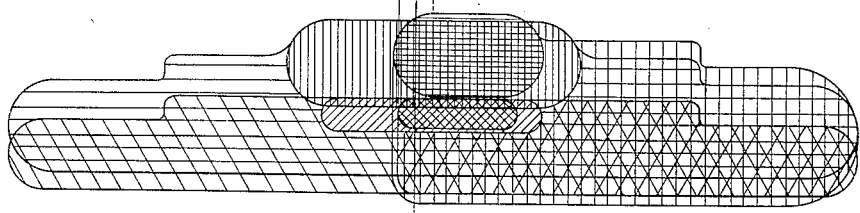

Fig. 49 — ALTERNATE COUNTRY UPPER BEAM PATTERN
INTERMEDIATE AND
LOWER FILAMENTS

Inventors
Robert N. Falge
& Charles E. Godley

Oct. 3, 1933.  R. N. FALGE ET AL  1,929,111
AUTOMOBILE HEAD LAMP
Filed May 23, 1931    18 Sheets-Sheet 11

Inventors
Robert N. Falge
& Charles E. Godley
By Blackmore, Spencer & Hult
Attorneys Oct. 3, 1933.  R. N. FALGE ET AL  1,929,111
AUTOMOBILE HEAD LAMP
Filed May 23, 1931   18 Sheets-Sheet 14

Inventors
Robert N. Falge
& Charles E. Godley
By Blackmore, Spencer & Hink
Attorneys Oct. 3, 1933.    R. N. FALGE ET AL    1,929,111
AUTOMOBILE HEAD LAMP
Filed May 23, 1931    18 Sheets-Sheet 15
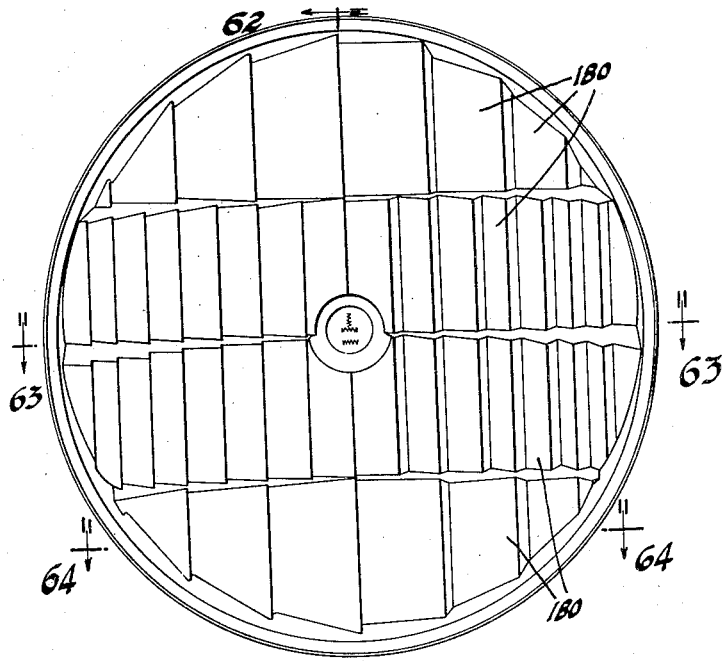
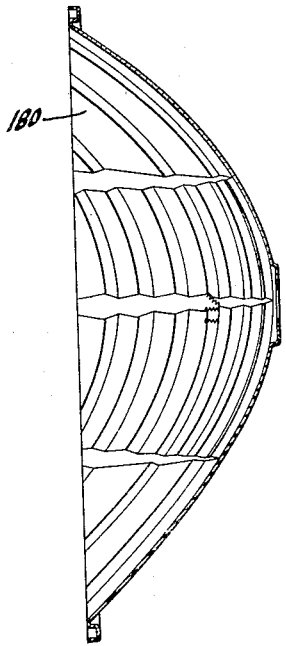
Fig.61    Fig.62
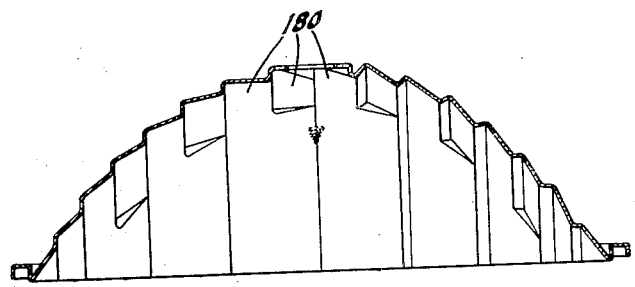
Fig.63
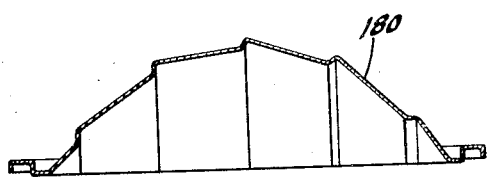
Fig.64
Inventors
Robert N. Falge
& Charles E. Godley
By Blackmore, Spencer & Hish
Attorneys Oct. 3, 1933. R. N. FALGE ET AL 1,929,111
AUTOMOBILE HEAD LAMP
Filed May 23, 1931 18 Sheets-Sheet 16

Inventors
Robert N. Falge
& Charles E. Godley
by Blackmore, Spencer & Hulse
Attorneys

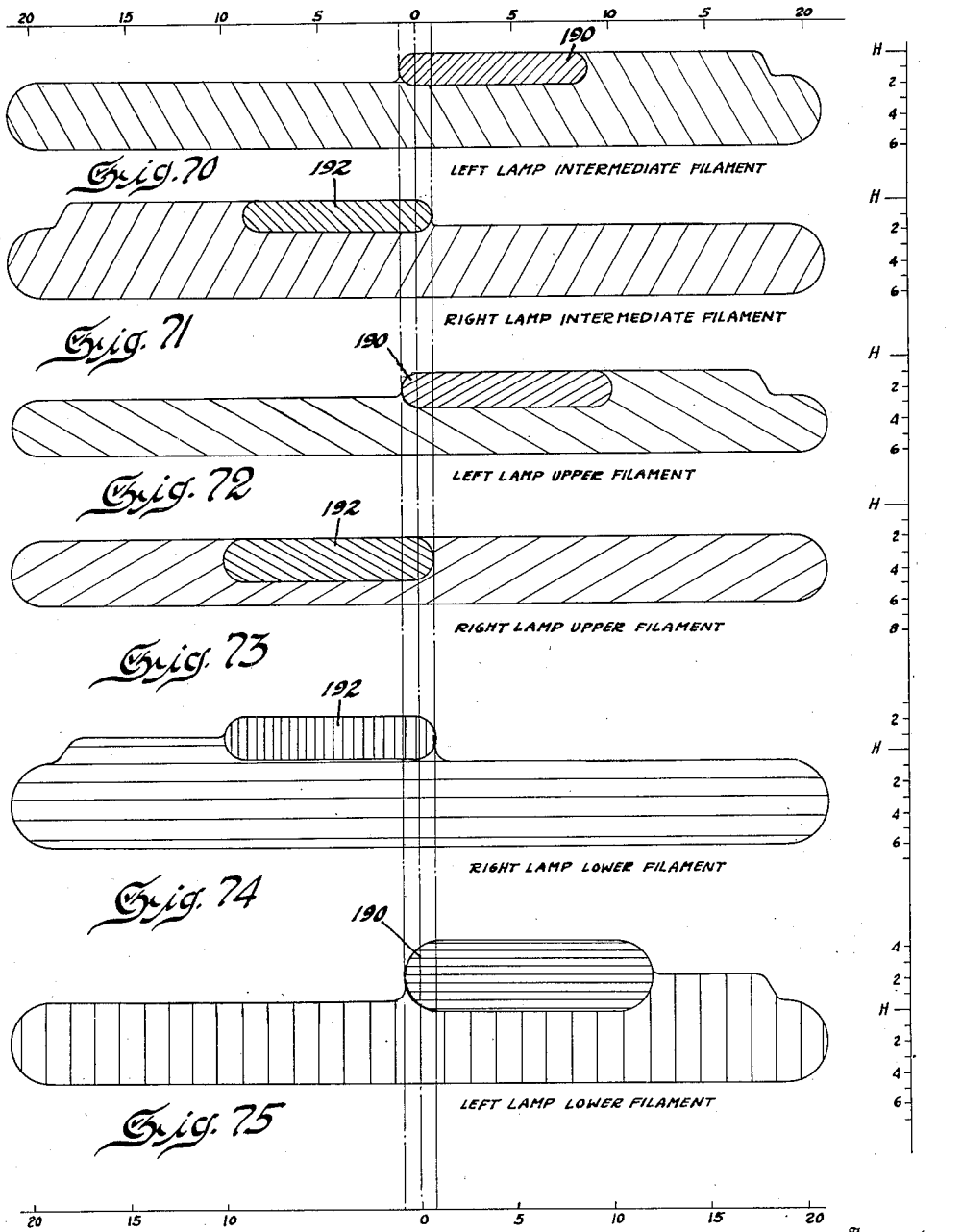

Oct. 3, 1933.  R. N. FALGE ET AL  1,929,111
AUTOMOBILE HEAD LAMP
Filed May 23, 1931   18 Sheets-Sheet 18

Inventors
Robert N. Falge
& Charles E. Godley
By Blackmore, Spencer & Heib
Attorneys Patented Oct. 3, 1933

1,929,111

UNITED STATES PATENT OFFICE 1,929,111

AUTOMOBILE HEAD LAMP

Robert N. Falge, Detroit, and Charles E. Godley, Ypsilanti, Mich., assignors, by mesne assignments, to Guide Lamp Corporation, Anderson, Ind., a corporation of Delaware Application May 23, 1931. Serial No. 539,518

10 Claims. (Cl. 240—41.25)

Present day automobile headlighting systems consisting of a reflector, lens and two filament bulb usually arranged with one filament at the focus of the reflector and one filament above the focus, provide two beams, a high beam for distant lighting and a low beam for city driving and for passing approaching vehicles. While this system is a great advance over prior single beam systems, it is unsatisfactory in a number of respects and undoubtedly its defects are responsible for many of the accidents and much of the inconvenience that attend night driving at the high speeds now customary. A few of these defects will be pointed out.

It is expected that the driver will depress his beam upon passing an approaching car so that no upwardly directed rays will strike the eyes of the driver of the approaching car. The lower beam now provided is depressed over its entire width and affords insufficient illumination for car speeds over 20 miles per hour. If the driver of the car is traveling at the rate of 50 or 60 miles per hour, using his upper beam, it is not fair to expect him to depress his beam for the benefit of the approaching driver and risk collision with obstacles or pedestrians not reached by his lower beam.

Another objection to present day light distribution is that in both beams as much light is thrown upon the left side of the road as upon the right side of the road. In passing another vehicle, the light thrown on the left side of the road is of little value, since the approaching headlamps light the left side of the road and the greater brilliance of the headlamps of the approaching car makes it difficult to see objects on the left of the road which are but relatively faintly illuminated by the light from the driver's own lamps. Light near the headlamp level on the left side is therefore largely wasted in passing. In our improved lighting system we have used this light to advantage on the right side of the road, sufficiently removed from the shining headlamps of the approaching car as to be effective in lighting the path of the driver's car and the ditch, and in revealing pedestrians walking along the edge of the road.

Practically every car built today is capable of attaining a speed of 60 miles per hour, and many of them are regularly driven at night at speeds in excess of fifty miles per hour. The upper beam provides sufficient illumination when traveling at such a rate of speed along a level road but upon approaching an upgrade the road is illuminated but a relatively short distance ahead owing to the substantially horizontal cut-off of the beam. Driving is thereby rendered unsafe at such speeds in hilly country. To remedy this condition it is necessary to direct light several degrees above the headlamp level.

Another objection to present day equipment is lack of sufficient candlepower in the upper beam to give good illumination at high speeds. This may be corrected in part by the use of higher powered filaments. However, since the distance within which a car can be brought to a stop varies approximately as the square of the speed, and the candlepower needed to reveal an object ahead varies approximately as the fourth power of the distance, the candlepower needed varies approximately as the eighth power of the speed. Increased candlepower necessitates increase in size of battery and generator at added cost. The great increase in candlepower required for a small increase in speed places a definite limit on this avenue of relief. A more logical solution is to distribute the light to better advantage by directing some light above the level of the headlamp centers where maximum benefit may be derived from a given increase in light output.

The present day upper beam, with its horizontal upper cut-off, affords inadequate illumination of road signs. The provision of more light above the horizontal is needed for this purpose and particularly on the right side of the road where the signs are usually located.

Our improved lighting system overcomes all of the serious defects of the present system at very little additional cost, and with very small increase in current consumption and consequently but little added drain on the battery and generator with which cars are now equipped.

In developing this invention a number of factors imposed limitations upon design. The modern headlamp is of "fixed-focus" type, that is, the bulb is fixedly mounted in the lamp, no adjusting mechanism being provided. The lamp is designed so that a satisfactory beam is obtained even though either of the two filaments be as much as .060 of an inch out of its correct position either up or down, or forward or back. This tolerance of .060 of an inch is sufficient to take care of the sum of all manufacturing inaccuracies that affect the positioning of the filament with respect to the reflector, such as inaccuracies in the positioning of the filament in the bulb, in the mounting of the socket in the reflector, etc. It is essential that headlamps retain this characteristic of "fixed-focus". The cost of the focusing mechanism is not only eliminated, but the service adjustment procedure is substantially simplified through the elimination of the more complicated focusing operation. Our preferred form of headlighting system is of the "fixed-focus" type.

Lack of adjustment in service is responsible for most of our headlighting troubles and it is for this reason essential that the lighting system be so designed as to make it possible to aim the lamps in a simple manner at the usual service stations. This requires that at least one of the arrangements of beams be such that the headlamps may be adjusted sidewise by means of a straight edge and vertically by aiming the lamps so that the tops of the beams coincide with a horizontal line on a wall. This is the procedure commonly used on present day equipment.

It is essential for immediate adoption that the headlamps project beams that comply with all of the State laws on lighting. While certain of the beams projected by our preferred design do not comply with the existing laws of all of the States, the system has been so devised that the electrical connections necessary for the illegal beams may be readily disconnected, permitting the use of the system, with some of its advantages in all of the States.

All of the practical objections to present day headlighting systems are overcome by the preferred form of our invention. However, in order to provide the public with a full knowledge of our system, and of its modifications, we have, in the specification which follows, set forth a number of alternative forms of headlighting equipment which will accomplish the results in lighting which we have sought. We have also described in more or less detail a number of other arrangements which are not as satisfactory as the preferred form, but which nevertheless come within the broad aspects of our invention. We have also pointed out the disadvantages compared with our preferred form.

According to our invention provision is made for the projection of a plurality of beams and the systems are all characterized by the provision of a lower beam which is asymmetrical in that it is lower on the left side than on the right side. This is the passing beam and while the lowered left side of the beam insures that no rays strike the eyes of the driver of an approaching car, the high right side of the beam gives safe illumination of the path for a considerable distance, making it possible to pass a car at high speeds without causing glare. We have accomplished this preferably by designing at least one of the headlamps so as to project a beam that is largely confined to the right hand side of the road so that when the beam from the other lamp is dropped an asymmetrical pattern high on the right hand side is obtained.

In a more highly developed embodiment of our system we have not been satisfied to provide simply one low beam and one high beam, as is now the common practice, but have also provided an additional beam or beams to better handle the wide range of driving conditions encountered. Thus our complete system may be characterized by a high beam for high speed country driving, referred to as the country upper beam, an asymmetrical lower beam for passing while driving in the country, referred to as the country lower beam, a high beam having its cut-off at a lower level than the cut-off of the country upper beam, referred to as the city upper beam, and an asymmetrical lower beam for passing in the city having its cut-off at a lower level than the cut-off of the country lower beam, referred to as the city lower-beam.

Of these, the country upper beam throws a considerable amount of light above the horizontal, and as a consequence would be illegal under the existing laws in a number of States. However, it provides excellent lighting for high speed driving, illuminates upward slopes in the road for a sufficient distance to insure safety, and provides adequate illumination of road signs and similar objects normally out of range.

The country lower beam is asymmetrical as above described, projecting light down the road at a higher elevation on the right side than on the left, but with the high right side of the beam at sufficient elevation to permit safe passing of other vehicles at much higher speeds than is possible with present equipment.

The country upper and country lower beams just described are distinguished from the city upper and city lower beams chiefly in that some light is projected further down the road and to secure the desired intensity of illumination for high speed driving we have preferably in each case brought an additional filament into action.

The city upper beam is preferably symmetrical, and is roughly the equivalent of the present-day high beam.

The city lower beam is asymmetrical, providing more light down the right hand side of the road and at a higher elevation thereby giving a much better passing light than the present day low beam. Its cutoff is somewhat lower than the cutoff of the asymmetrical country lower beam, thereby reducing the possibility of glare, and adapting the beam for city use.

In the preferred form of our invention all of the beams are unbalanced in intensity measured from the longitudinal center line of the car. We have concentrated from two to five times as much light on the right hand side of the road as on the left hand side of the road. This is true in both the high beams and the low beams. We have accomplished this by spreading the light from one headlamp across the entire width of the road and concentrating the light from the other headlamp largely upon one side of the road. We have found this distribution very desirable not only because it reduces glare but also because it concentrates the light along the path of the car and the right of the road where it is most useful.

Figure 1 is a top plan view of an automobile showing the horizontal distribution of light with the preferred form of our system.

Figure 2 is a vertical section through one form of right hand headlamp employed in our system.

Figure 3 is a vertical section through a modified form of right hand headlamp.

Figure 7 is a side elevation and Figure 8 is an end view, the glass envelope in each case being broken away; while Figure 9 is a top plan view with the glass envelope removed.

Figure 7:
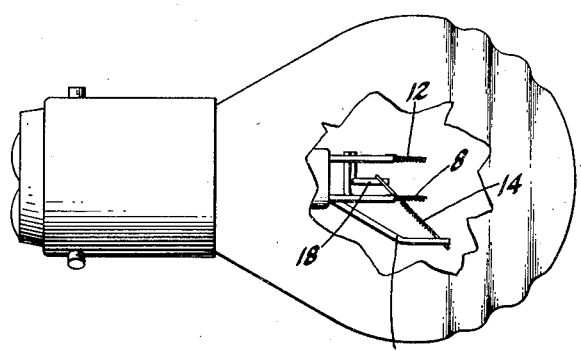
Figures 7 to 9 are views of our preferred form of three filament bulb.
Figure 8:
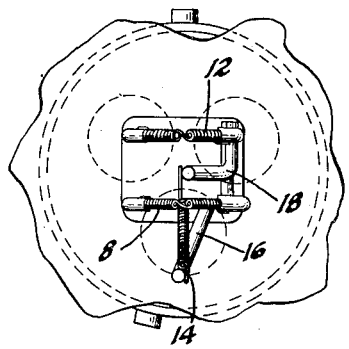
Figure 9:
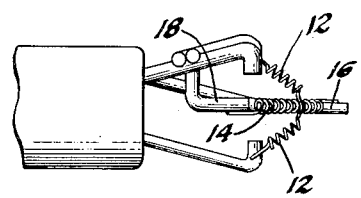

Modifications of three filament bulb are shown in each of the following groups of figures, the views in each group being similar to Figures 7 to 9: Figures 10 to 12, 13 to 15, 16 to 18, 19 to 21, and 22 to 24. It will be noted that in Figure 13 the bulb is shown mounted in a reflector to illustrate its position in use.

Figures 25 to 27 illustrate a type of two filament bulb that can be used along with a new left headlamp lens to convert present day headlighting systems into more satisfactory asymmetrical beam systems. Figure 25 shows the bulb in side elevation with the glass envelope removed, Figure 26 shows the bulb in top plan, while Figure 27 is an end view, the envelope being broken away.

Figure 28:
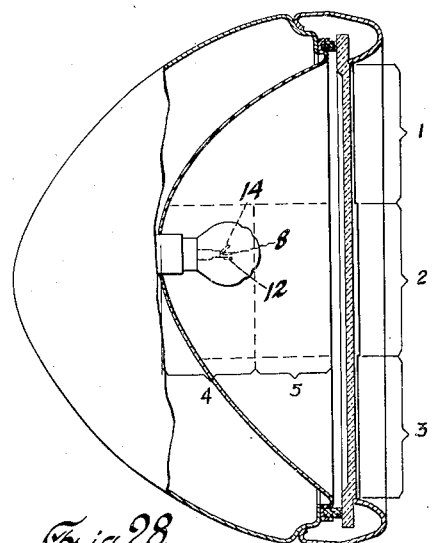
Figure 29:
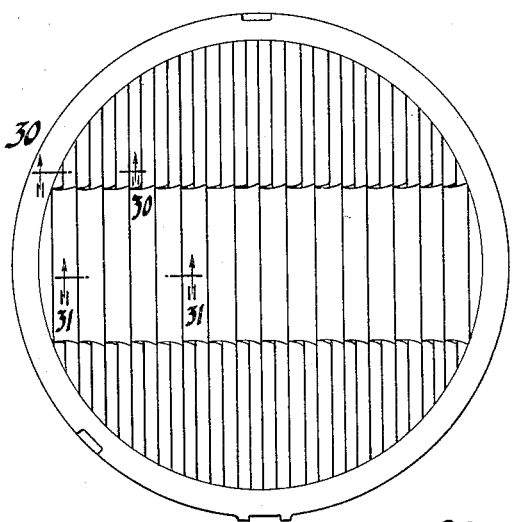
Figure 30:
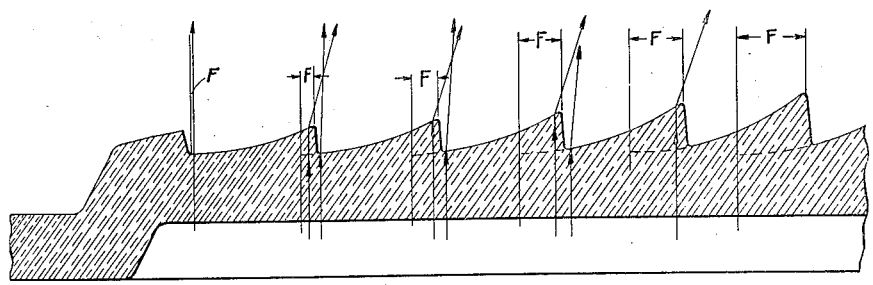
Figure 31:
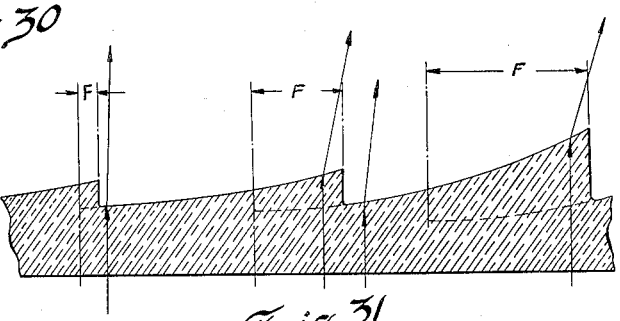

Figure 28 is a vertical section through our preferred form of left headlamp, while Figure 29 is a front view of the lens. Figures 30 and 31 are sections taken on the corresponding lines of Figure 29.

Figure 32:
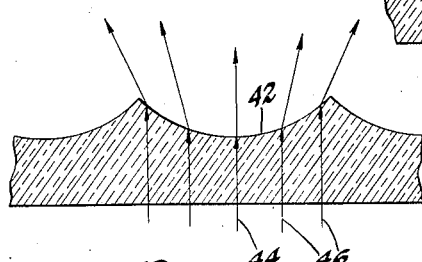

Figure 32 is a diagrammatic view explaining the action of flutes in spreading the light rays and determining light distribution.

Figure 33:
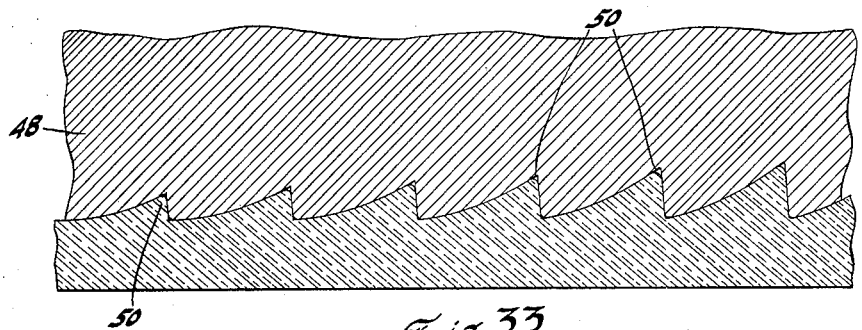
Figure 34:
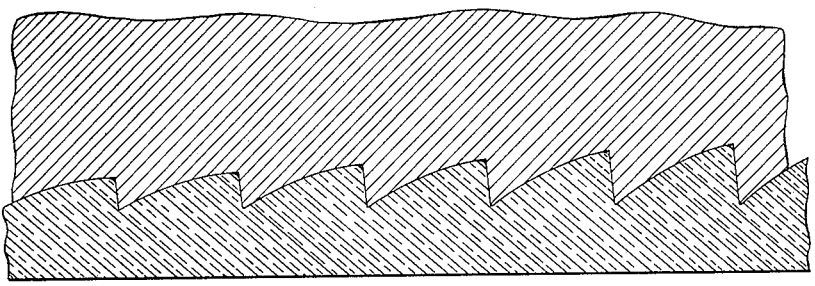

Figures 33 and 34 are diagrammatic sectional views showing the method of forming concave and convex half flutes, respectively.

Figure 35:
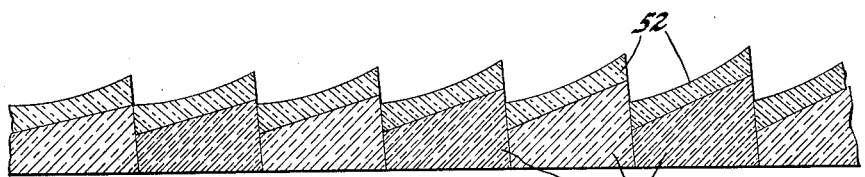
Figure 36:
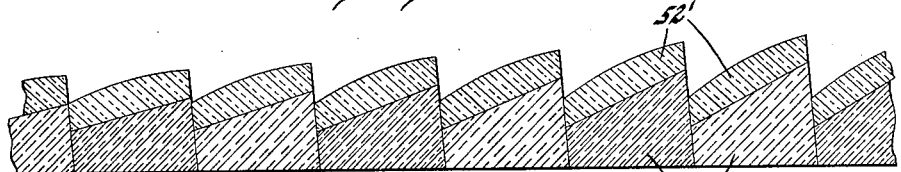

Figures 35 and 36 are sections through concave and convex half flutes presenting a graphical analysis of their optical equivalents.

Figure 37:
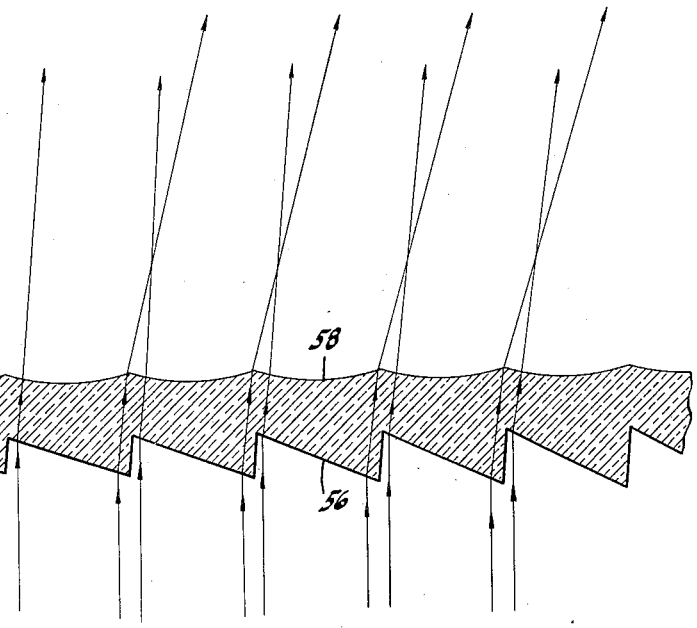
Figure 38:
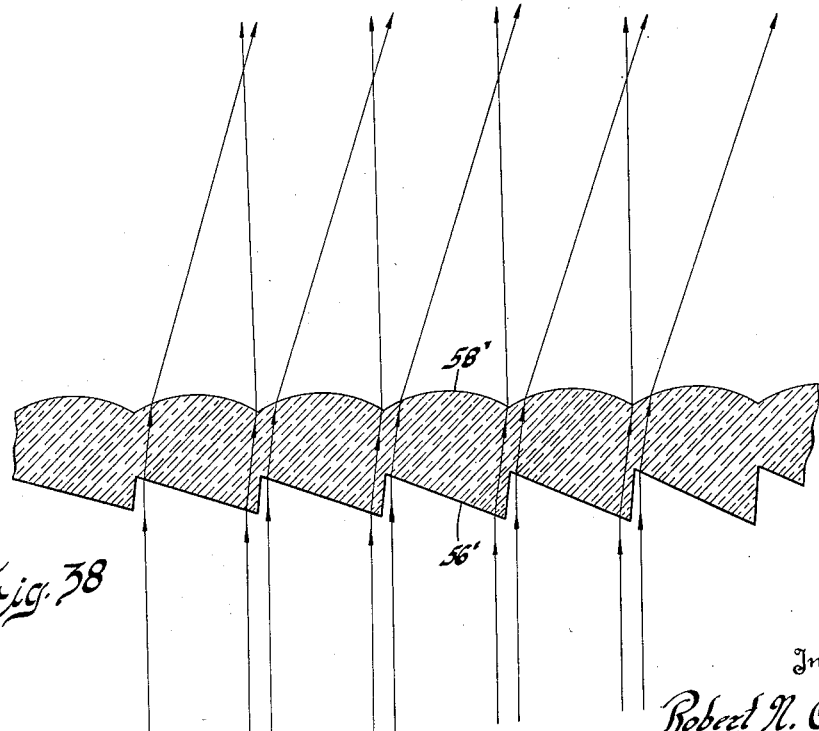

Figures 37 and 38 show alternative forms of lens element to effect the desired lateral distribution.

Figures 39 to 44 are beam patterns produced by the individual filaments of the bulb shown in Figures 7 to 9 when used in our headlamps.

Figure 45 is the city upper beam pattern produced by our lighting system.

Figure 46 is the country lower beam pattern; Figure 47 is the city lower beam pattern; Figure 48 is the country upper beam pattern; Figure 49 is the alternate country upper beam pattern.

Figure 50:
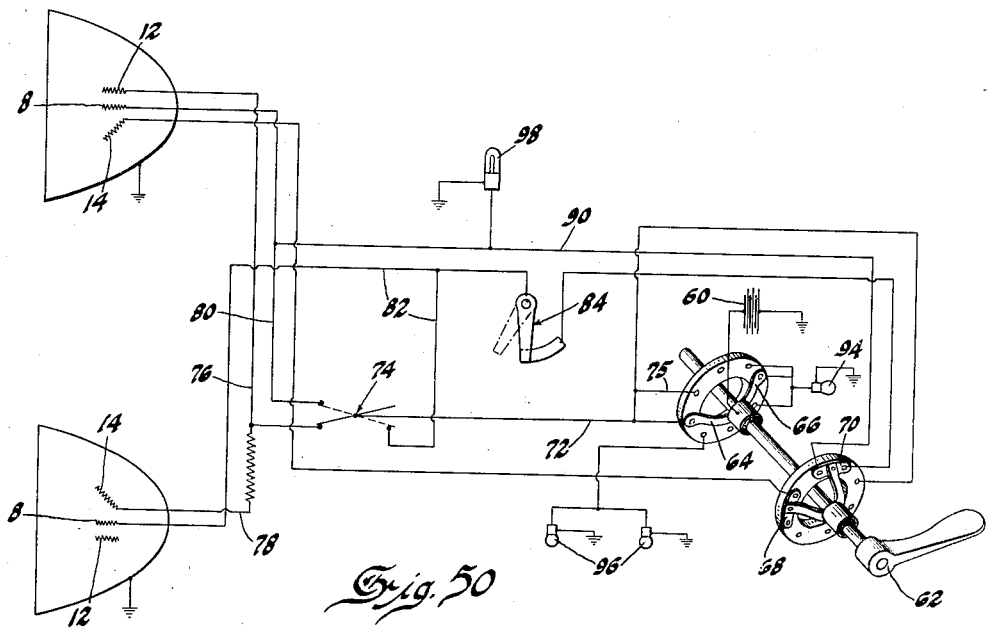
Figure 51:
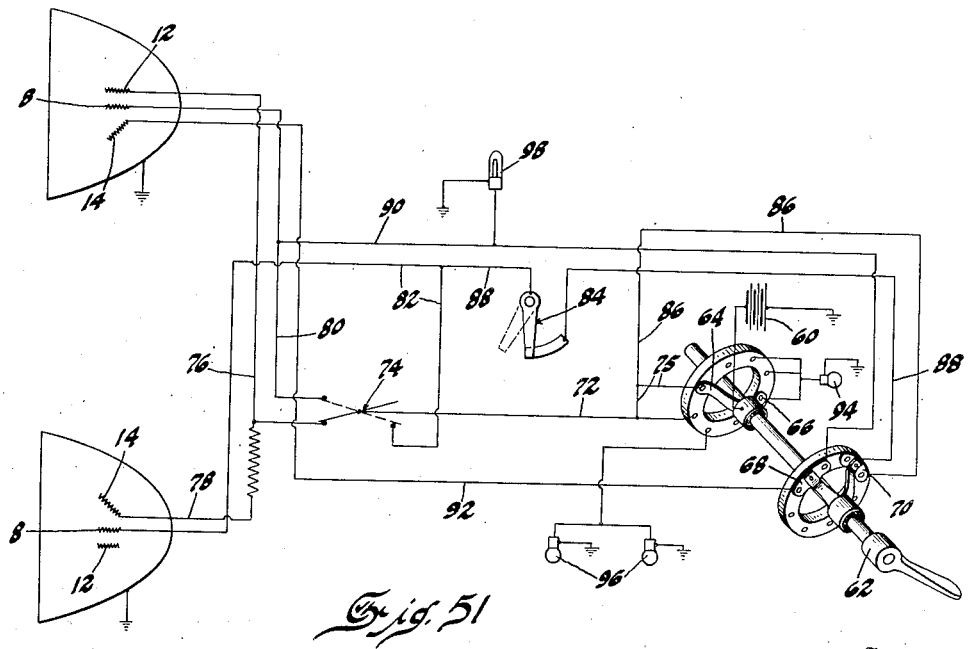

Figures 50 and 51 are diagrammatic views showing the preferred form of lighting circuit for our improved lighting system, the circuit being shown in different operative positions in the two views.

Figure 52:
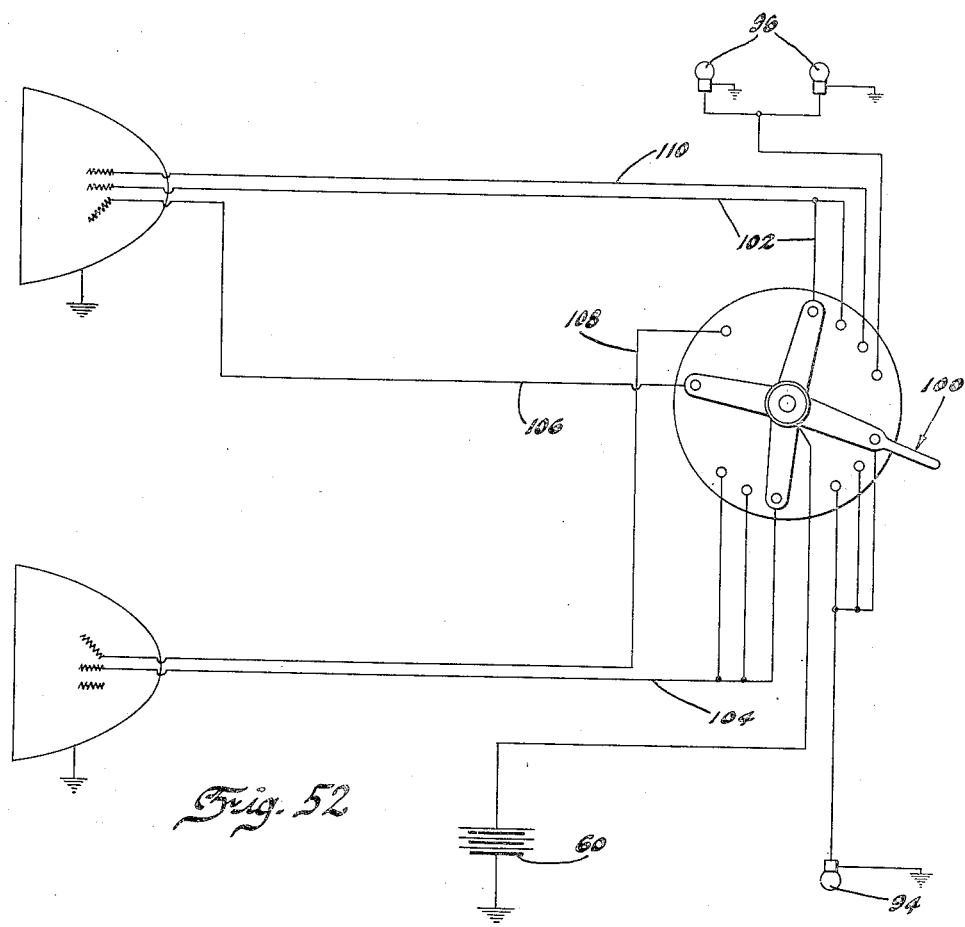

Figure 52 is a diagrammatic view showing an alternative form of lighting circuit which is operated by a single switch.

Figure 53:
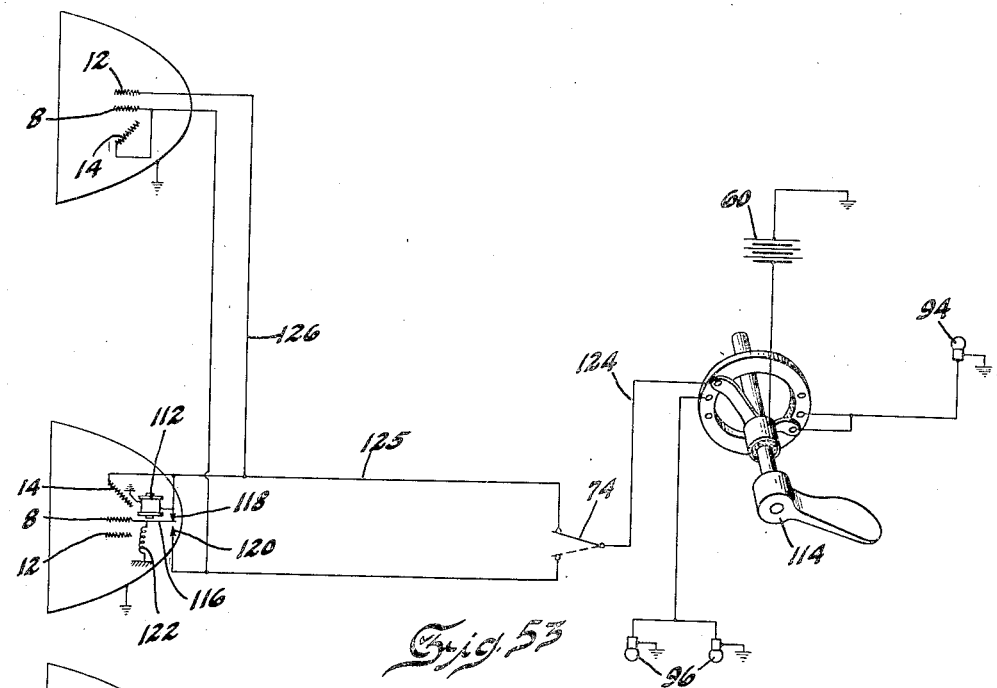

Figure 53 is a diagrammatic view showing a circuit for use in installing a two beam asymmetrical system on cars now in service.

Figure 54:
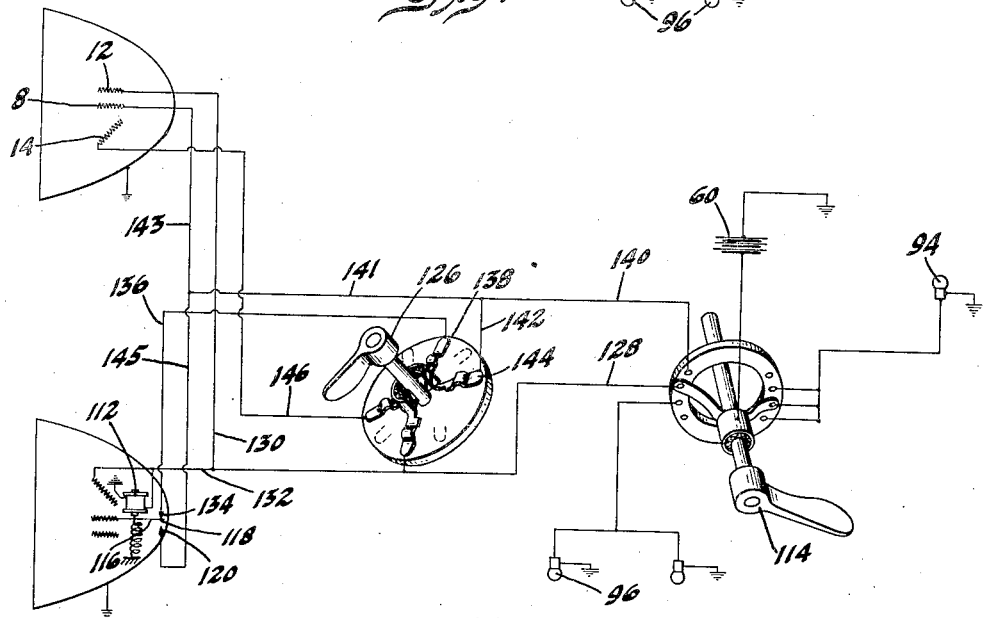

Figure 54 is a diagrammatic view showing a circuit for use in installing a four beam asymmetrical system on cars now in service.

Figures 55, 56, 57:
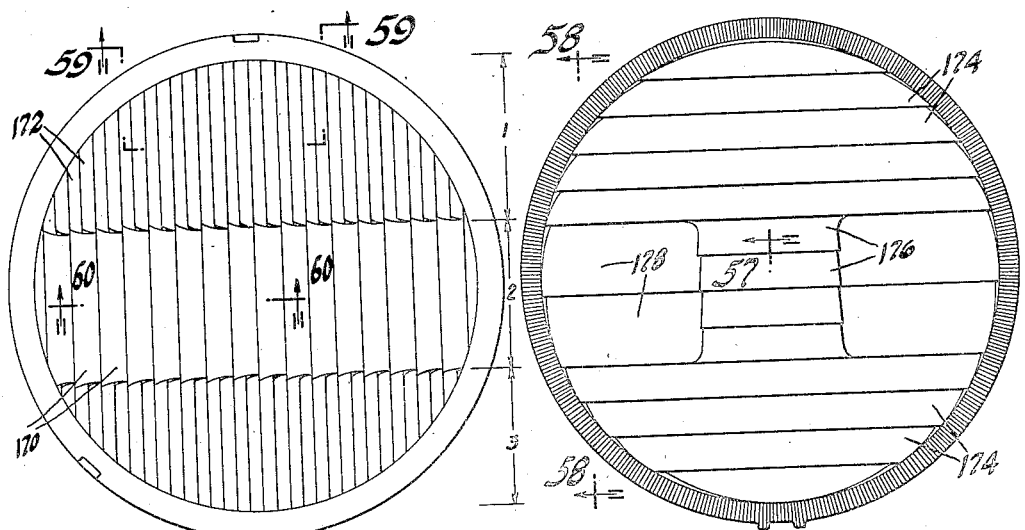
Figure 60:
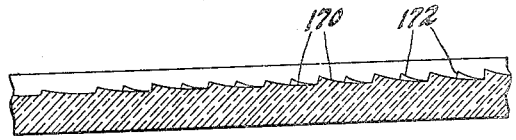
Figure 59:
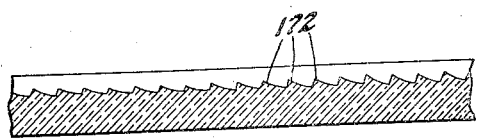
Figure 58:
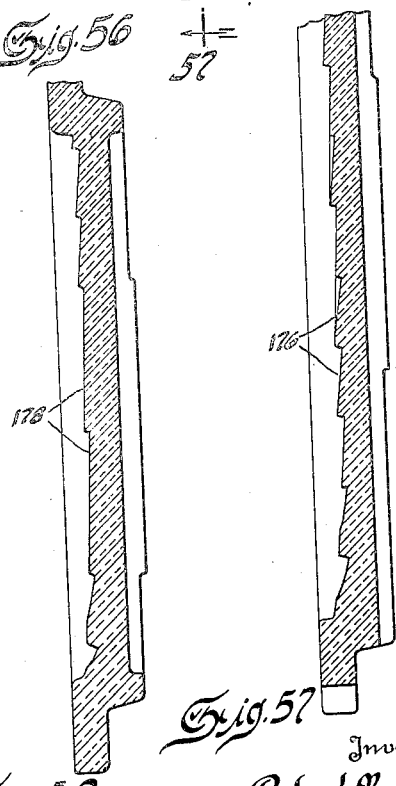

Figures 55 to 60 are views of a modified form of lens which may be used in combination with a paraboloidal reflector to constitute our left headlamp. Of these, Figures 55 and 56 are views of opposite faces of the lens, while Figures 57 to 60 are sections taken on the corresponding section lines of Figures 55 and 56.

Figures 61 to 64 are views of a fluted reflector which may be employed in the left headlamp. Of these, Figure 61 is a front elevation of the reflector, while Figures 62 to 64 are sections taken on the corresponding section lines of Figure 61.

Figure 65:
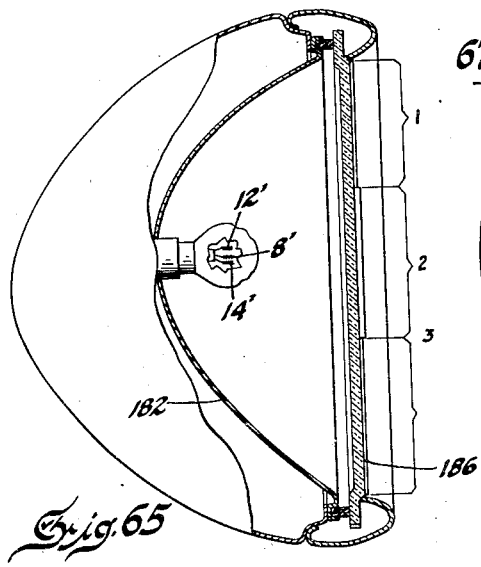

Figure 65 is a vertical section through a modified form of headlamp.

Figure 66:
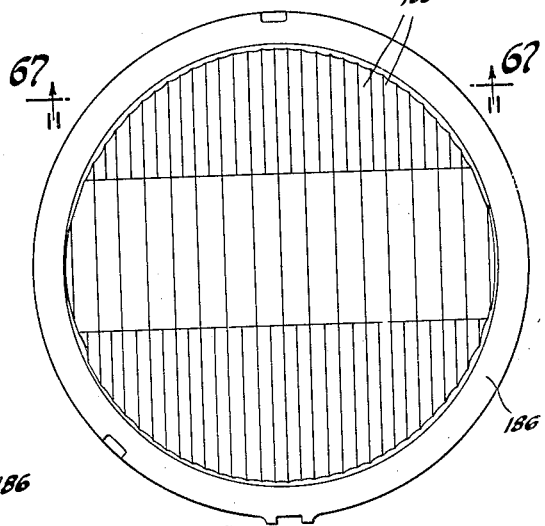

Figure 66 is a face view of the lens shown in Figure 65.

Figure 67:

Figure 67 is a section on line 67—67 of Figure 66.

Figure 68:
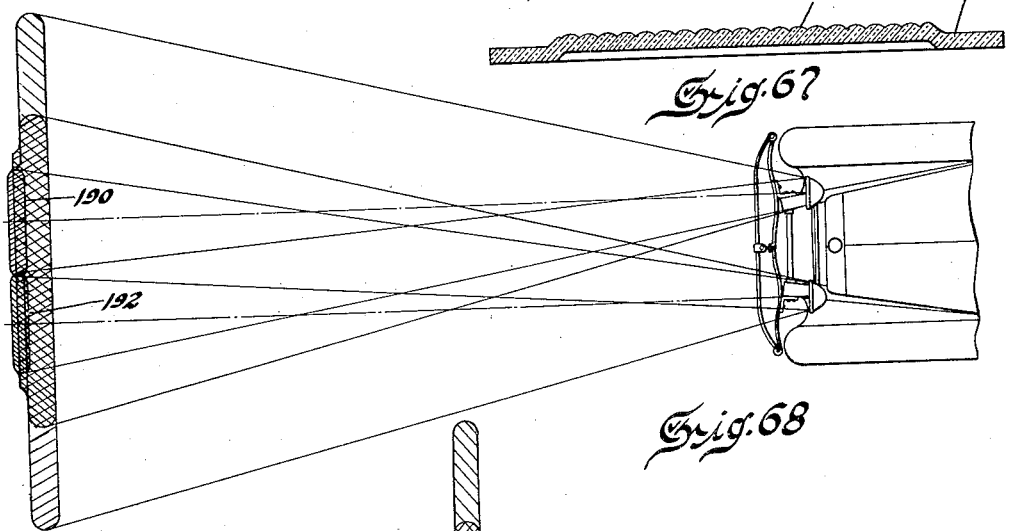

Figure 68 is a view similar to Figure 1, but showing the beam pattern as well as the beam produced by the form of headlamp shown in Figures 65 to 67, the pattern being shown as it would appear on a surface inclined at approximately 45° to the horizontal.

Figure 69:
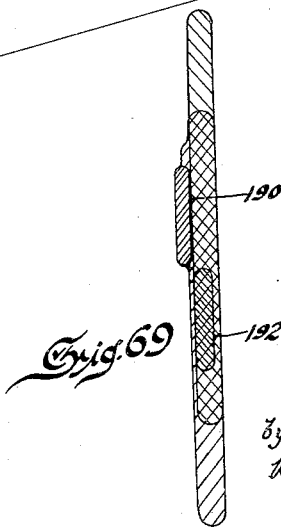

Figure 69 shows the corresponding asymmetrical beam pattern.

Figures 70 to 75 are illustrations of the beam patterns produced with headlamps of the construction in Figures 65 to 67, each pattern bearing an explanatory legend.

Figure 76:
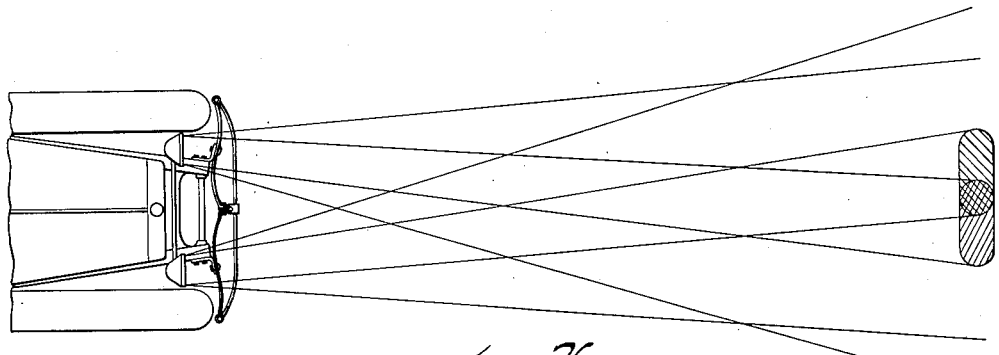

Figure 76 is a view corresponding to Figure 1, showing a modified lighting system and the hot spots of the beam pattern as they would appear on a surface inclined at approximately 45°.

Figure 77:
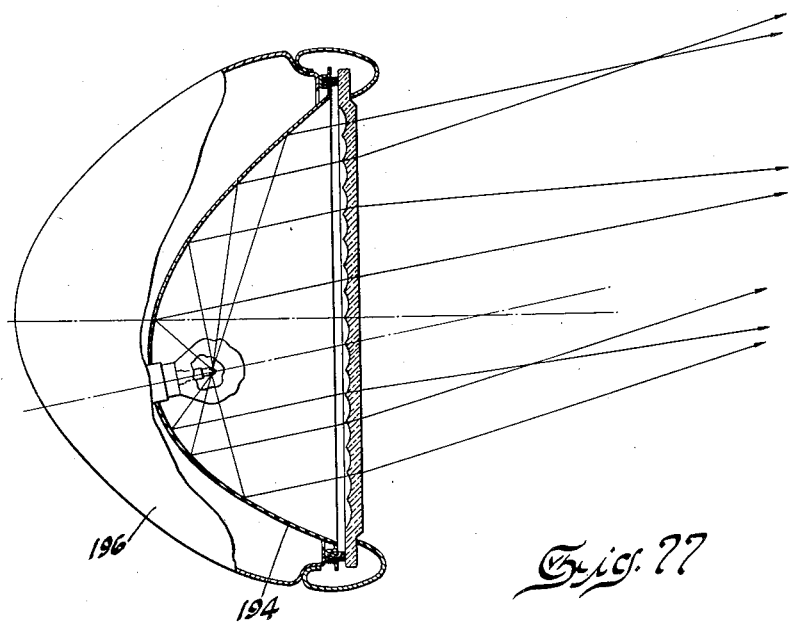

Figure 77 is a horizontal section through the right headlamp of Figure 76.

We shall first describe our preferred design of headlighting system.

In Figure 1 we have shown a top plan view of an automobile equipped with our improved headlighting system and having indicated the general form of the beams projected from the lamps as viewed from above. The dotted line A—A indicates the center line of the car. The left headlamp L projects a beam, the left limit of which is defined by a line B—B cutting the left edge of the lamp and approximately parallel to the car axis. Roughly speaking, this limit may be taken as the lamp center line. The right hand limit C—C of the beam diverges to the right so that the beam includes within its sweep the entire right side of the road including the ditch. Since substantially no rays from the left headlamp go to the left of the lamp center line the driver of an approaching car is safeguarded from glare from this lamp. This same light is used to greater advantage on the right side of the road.

The right headlamp R projects a beam which is substantially symmetrical with respect to the lamp center line and illuminates the full width of the roadway, following present practice. We have indicated the angles "a" that the lateral spread of the beam from the right headlamp is substantially twice that from the left headlamp.

With this distribution it will be noted that the far left side of the roadway is substantially illuminated only by rays from the right headlamp, while the center and right hand side of the roadway receive substantially all of the light of the left headlamp and one half of the light of the right headlamp. The concentration of light on the center and right side of the road gives better illumination especially in passing approaching cars.

To obtain this effect it is necessary, in this form of our invention, to use a different design of headlamp on the left than on the right, although we have so designed our system that the same bulb may be used in both lamps.

Forms of headlamps which may be used on the right are illustrated in Figures 2 and 3. Both types illustrated are well known and except as units in our improved system are no part of our present invention. In present day headlamp design but two elements are employed to direct light; the reflector and the lens. In Figure 2 we have shown what is termed in the trade a "reflector job" and in Figure 3 we have shown what is termed a "lens job." In addition to these there are hybrid types, as will be later pointed out.

The reflectors employed in present day headlights are either true paraboloids or modified paraboloids. Ellipsoids and hyperboloids approach paraboloids as one limit, and near these limits may be used as substitutes for paraboloids, to simplify the discussion it will be restricted to paraboloids. Considered generically, all of the types of reflectors with which this invention has to do are of concave form, and serve to concentrate upon the road the light emitted from a source located at or adjacent the focal region in a beam of comparatively few degrees in depth.

The following properties of a paraboloid are well known:

If a paraboloidal reflector be cut by a plane normal to the reflector axis and intersecting the axis slightly to the rear of the focal plane the center portion of the reflector lying to the rear of the focal plane will be found to be very sensitive to vertical changes in the position of the light source. Thus if the source in a reflector of conventional focal length be moved from the focus to a point ⅛″ above the focus the light will be thrown down 4° or more. As to the remainder of the reflector which lies wholly forward of the focal plane, the rays reflected from the top and bottom portions will be found to be practically insensitive to changes in the vertical position of the light source. The rays reflected from the side portions will be found to be less sensitive to changes in the vertical position of the light source than rays reflected from the apex, movement of the light source to a position ⅛″ above focus producing a downward tilt of about 2° in the rays reflected from the sides.

These properties are made use of in the designing of modern two-beam headlamps to produce a downward tilt of the beam by shift in the vertical position of the light source. Thus the top and bottom portions of the reflector may be bent downwardly in an amount sufficient to direct the reflected rays toward the bottom of the high beam, that is, the beam produced with the source at the focus of the reflector. The rays from the intermediate portion of the reflector then form the top of the beam. The center of the intermediate portion which, as previously described, lies to the rear of the focal plane, is very sensitive to changes in filament positioning, and if this light were left at the top of the beam slight variations in filament positioning would cause the rays to rise above the horizontal, producing glare. To make the lamps fixed-focus it is necessary to take the top light for the high beam from the sides of the intermediate portion, which are relatively insensitive. This is accomplished by bending the center of the intermediate portion of the reflector downwardly, say a degree, leaving the side light for the top of the beam.

It is well known among lighting engineers that the same results may be accomplished by bending the rays from the corresponding parts of a plain parabolic reflector downwardly in the varying degrees required, by the employment of prisms on the lens instead of bending the reflector. Thus relatively heavy prisms may be provided on the top and bottom portions of the lens, and a weaker prism may be provided over the center of the intermediate portion of the lens.

It is also well known that instead of bending downwardly the light from the center of the intermediate portion by bending down the corresponding reflector zone or providing down bending prisms on the lens, this portion may be rendered insensitive by axially offsetting the top and bottom of the interemdiate portion of the reflector in the manner described and claimed in the patents to Clark No. 1,136,507, granted Apr. 20, 1915, and Michel No. 1,594,544, granted Aug. 3, 1926.

Obviously this same method may be incorporated in the lens design by the provision of appropriate prisms.

It is also well known to the lighting engineer that hybrid systems may be used. The top of the reflector may be bent down, and the bottom of the lens provided with a down-tilting prism, or vice versa. For a more complete discussion of this problem we refer the reader to the following patents:

Falge and Johnson Patent No. 1,571,714, granted February 2, 1926, Falge and Brown Patent No. 1,871,505, granted August 16, 1932, Brown Patent No. 1,822,839, granted September 8, 1931, and Michel Patent No. 1,655,914, granted January 10, 1928.

Our invention involves as an element of the system special treatment of reflector, lens, or both, in the manner above described to obtain tilting of the beam. Since bending of portions of the reflector and the provision of prisms on the lens are well known to be equivalents by those skilled in the art we have chosen to coin language to cover both methods of treatment of the rays. Another consideration that makes it desirable to do this, is the fact that the boundaries between the portions of the reflector are not sharp and definite, but the portions blend into each other, and this gradual blending makes it possible for designers to somewhat arbitrarily separate the zones along horizontal lines, or arcs of different curvature, and, with respect to the apex, in the shape of parallelograms or keystones. All of this is likewise well known.

In order to obtain requisite scope for our invention we have therefore referred to the top and bottom portions of the light projecting means of our headlamp as "upper and lower zones", and to the intermediate portion as the "intermediate zone." We are employing the word "zone" in a sense to include either a reflector alone or a reflector in combination with the portion of a lens or cover glass in front of it. The necessity for this nomenclature will become apparent in the course of the following description.

Referring now to the alternative forms of headlamps shown in Figures 2 and 3, we have shown these divided into upper zone 1, intermediate zone 2, and lower zone 3. The intermediate zone includes the center portion 4, and the side portions 5.

In Figure 2 the rays striking the upper and lower portions of the reflector included in zones 1 and 3 are bent downwardly by tilting these portions downwardly, as indicated by the tilted axis 1'—1'. The rays striking the center portion of the reflector included in the intermediate zone 2 are bent downwardly by tilting this portion downwardly as indicated by the tilted axis 4'—4'. The axis of the side portions of the reflector included in the intermediate zone remains horizontal as indicated by the axis 5'—5'.

The lamp shown in Figure 3 differs from that shown in Figure 2 in that a plain parabolic reflector is used, and tilting of the rays from the upper and lower zones 1 and 3 is accomplished by employing down-bending prisms 10 and 30 over the corresponding portions of the reflector. The slight downward tilting of the rays from the center portion 4 is accomplished by employing light down-bending prisms 20 on the center of the lens.

In both the headlamp shown in Figure 2 and that shown in Figure 3 the light is spread laterally in the desired manner by employing symmetrical, vertical, concave or convex flutes 6 on the lens. In Figure 3 these flutes may be superimposed on the prisms or arranged on the opposite face of the lens as shown. The degree of spread of light from different portions of the reflector may be varied as desired to produce any preferred beam pattern. The same result could of course be accomplished by fluting the reflector in the manner described and claimed in the patent to Brown No. 1,546,281, granted July 14, 1925.

Light is obtained from a three filament bulb of special design shown in detail in Figures 7 to 9. The intermediate filament 8 is a helical V-shaped filament of conventional design. So is the filament 12 to one side of the axis. The remaining filament 14 is a straight coil filament extending from the lead in wire 16 to one side of the center filament to the lead in wire 18 between the legs of the intermediate filament 8. It is inclined at an angle to the axis of the lamp to give a relatively deep beam of light. The angle may be of any value but is preferably 45°. The filaments 8 and 12 are preferably spaced about $\frac{1}{8}''$ to give the desired 2° tilt when going to the upper filament. The described arrangement of filament 14 gives the effect of $\frac{1}{16}''$ spacing from the filament 8, because this is the average distance between the two, and also because part of filament 14 is behind focus. The importance of this spacing will be pointed out later.

It is also important that the filament 14 overlap the intermediate filament 8 in order to secure a smooth overlapped beam pattern for the country upper and lower beams as will be later explained. This result may be secured also by employing bulbs of the types shown in Figures 10 to 27.

Figure 10:
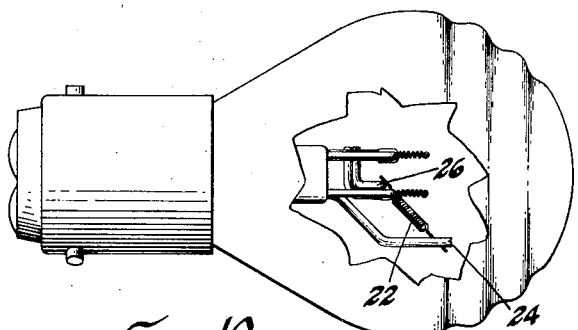
Figure 11:
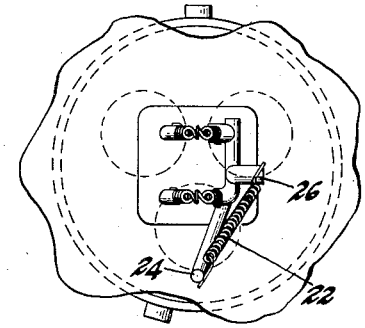
Figure 12:
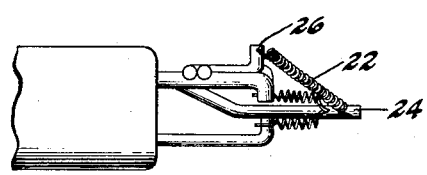

In Figures 10 to 12 is shown a bulb containing two V-type filaments similar to those shown in Figures 7 to 9 and one straight coil filament 22 extending from the lead-in wire 24 to one side of the intermediate filament to the lead-in wire 26 to the other side of the intermediate filament. With this design the effect of the filament extending at an angle to one side as well as at an angle in a vertical plane is to distort the beam from this filament in the opposite direction. This is undesirable in that it interferes with the attainment of a vertical cut-off line when the bulb is used in the left headlamp to light the center and right hand side of the road. This sidewise distortion is present also when the bulb is used in the right hand lamp for providing light above the headlamp level, but the effect is less objectionable in this case.

Both types of bulb so far described have been designed for convenience in manufacture. The points where the filaments are welded to the lead-in wires are arranged in such manner that welding jaws of ample size may be readily inserted between the various lead wires. In these designs as well as in the others now to be described the welding joints are sufficiently removed from each other so that the filaments will not fail at the joints connecting them to the common lead at relatively low voltage when two are burned simultaneously.

Figure 13:
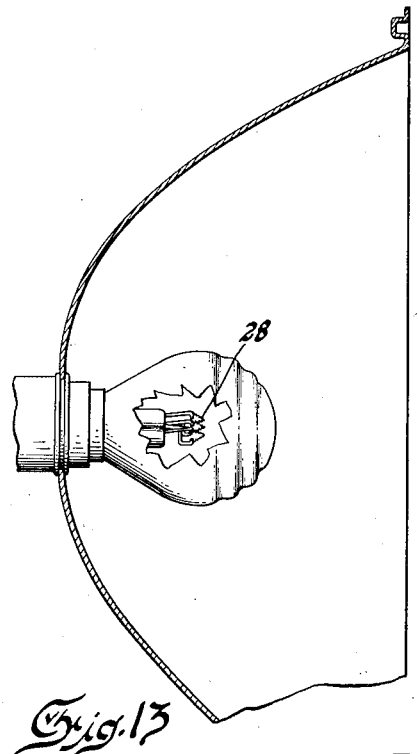
Figure 14:
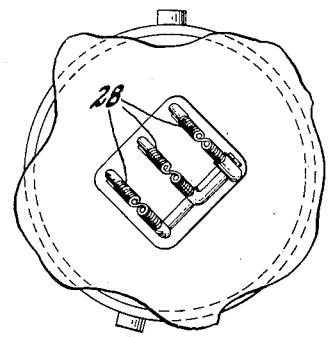
Figure 15:
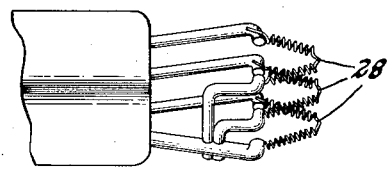

In Figures 13 to 15 is shown a bulb containing three helical V-shaped filaments 28, the bulb being mounted with the line bisecting the filaments inclined at such an angle to the vertical as to cause the filaments to overlap when projected on a vertical plane. This design, like the design of Figures 10 to 12, is objectionable in that it slues the beam off to one side.

Fair results may be obtained by employing the bulb shown in Figures 16 to 18 in which the lowermost filament 32 is spaced but a slight distance below the intermediate filament. This construction affords sufficient overlapping of the beams from the two closely spaced filaments and accomplishes substantially the same result as is obtained by the use of the angled filament of the preferred form. The design has the disadvantage in production that the welding plate, which must be inserted between the closely spaced lead wires, must be very thin, and, therefore, of relatively short life.

In the design just described it will be found somewhat difficult to weld the intermediate filament to the lead wires because of the interference of the lead wires to the outside filaments. This may be remedied by adjusting the location of the filaments fore and aft to provide the needed clearance, although such adjustment will have some effect on the resulting beam patterns.

Figure 16:
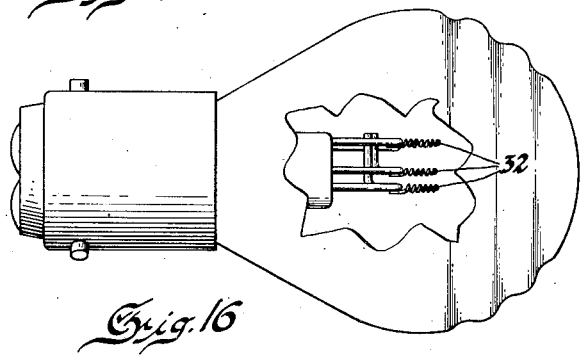
Figure 17:
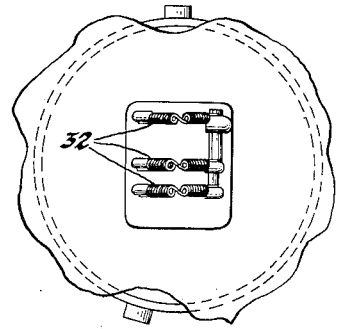
Figure 18:
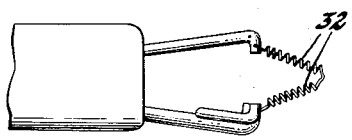

The bulb shown in Figures 19 to 21 is similar to that shown in Figures 16 to 18 except that the lowermost filament 34 is inclined at an angle to the longitudinal center line of the bulb, the optical effects of this arrangement being somewhat different from those obtained by the arrangement in Figures 16 to 18. The inclining of the one filament deepens the hot spot, and tends to avoid streaks and shadows in the beam.

A further variation in the optical effect of the lowermost filament is obtained by the arrangement shown in Figures 22 to 24 in which the lowermost filament 36 is V-shaped and lies in a vertical plane passing through the longitudinal center line of the bulb. The lower leg of the lower filament is substantially horizontal while the upper leg is inclined at an angle to the longitudinal center line of the bulb and overlaps the intermediate filament giving a smooth overlapped beam pattern.

The filament arrangements shown in Figures 13 to 24 have the further advantage that the amount of light intercepted by the lead wires is a minimum since they do not project forwardly into the region occupied by the filaments. Such light as is lost in this way by employing the designs shown in Figures 7 to 12, and 25 to 27, is however probably of minor importance since it is light which would ordinarily be directed to the top or bottom section of the reflector, and does not form a part of the hot spot.

Figures 25 to 27 show a two filament bulb which can be used in combination with one new lens to convert a symmetrical beam system now in service into an asymmetrical system containing some of the advantages of our preferred system. One filament 38 is the standard V-type in the usual position while the other filament 40 is of the same type as that shown in Figures 7 to 9 but may take any of the forms described in connection with the lowermost filaments of Figures 7 to 17.

The arrangement of filaments just described and the manner in which they will be used in the headlamps is such as to provide maximum light output from any given filament at times when it is most needed. By building up a beam through the use of two filaments, burning simultaneously, the tendency of one filament to heat the other serves to increase the light output from both as compared to what either would give if burned alone. Under country driving conditions, therefore, where two filaments are burned at the same time the light output from each would be higher than would be the case where they were burned individually as in the case of the city driving beams.

The forms of bulb disclosed in Figures 7 to 12 and 22 to 24 are disclosed and claimed in our Patent No. 1,913,196, granted June 6, 1933, the patent being a division of the present application.

Figure 4:
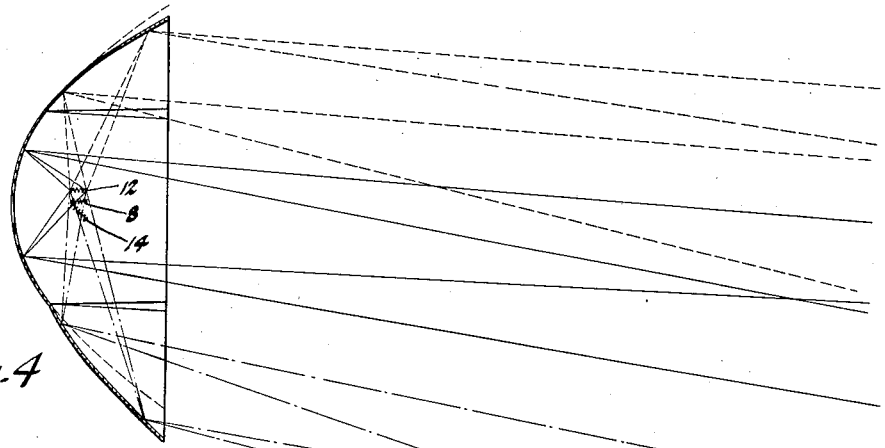
Figures 4 to 6 are diagrammatic views showing the vertical distribution of rays projected from the headlamp shown in Figure 2 when provided with our improved form of three filament bulb, each view showing a different filament lighted.
Figure 5:
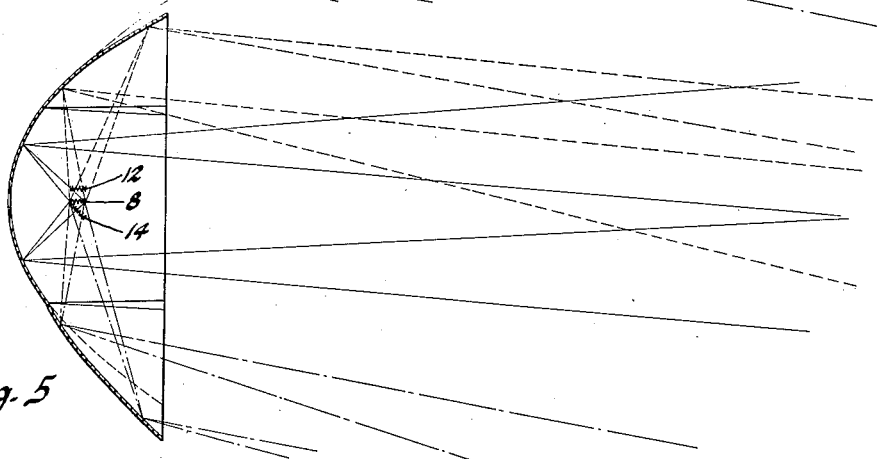
Figure 6:
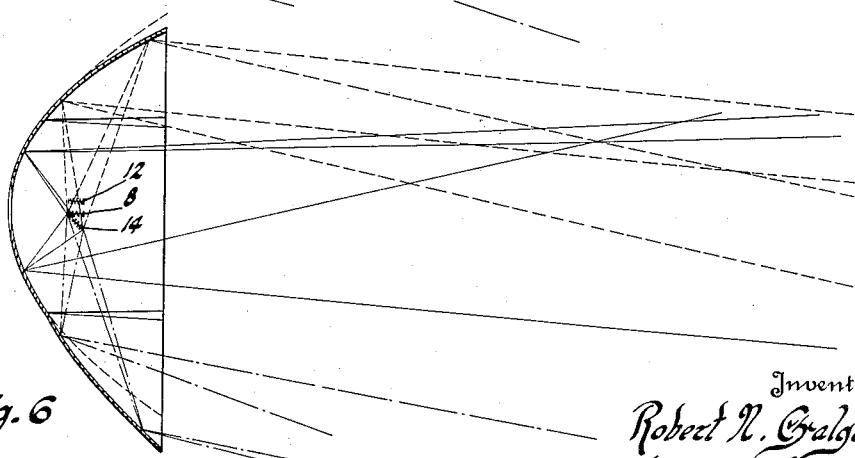

The preferred form of bulb is shown mounted in the headlamps of Figures 2 and 3 with the intermediate filament 8 on the axis, and the inclined filament 14 below the axis. We have illustrated in Figures 4 to 6 the directions of the cones of rays produced by each of the filaments and projected by reflectors of the design shown in Figure 2. It is apparent that the overlapping of the two lower filaments insures that there will be no dark streaks between the beams when both filaments are lighted. This is an important feature of our invention for without overlapping or substantially overlapping of the lowermost filaments we have found it impossible to avoid serious dark streaks in the beam patterns, and this means unsatisfactory illumination.

The beam patterns obtained with the right headlamps shown in Figures 2 and 3 are illustrated in Figures 39, 41 and 43. The beam pattern of Figure 39 is produced by the intermediate filament 8. This is the high beam of present day lighting systems and forms part of our high beams.

The beam pattern of Figure 41 is produced by the filament 12. This is the low beam of present day lighting systems and forms part of our low beams.

The beam pattern of Figure 43 is the beam produced by the inclined filament 14. This is part of the country beam peculiar to our system. The beam is higher than the other beams because the filament is below focus. The beam has greater depth for this reason and because of the length and inclination of the filament.

All of these beams may be obtained without providing for adjustment of the bulb in the reflector, the arrangement being practically insensitive to .060" movement of the filament in any direction from its correct position in the reflector.

One form of left headlamp is shown in Figures 28 to 31. This lamp is likewise divided into upper zone 1, intermediate zone 2, and lower zone 3. The intermediate zone consists of center portion 4 and side portions 5, as previously described. The reflector is identical with that shown in the headlamp of Figure 2. The bulb is identical but occupies a position rotated axially 180° from the position of the bulb in the right headlamp. This brings the angled filament 14 above the intermediate filament 8.

The left headlamp is equipped with a special lens. In this form of the invention the lens controls the lateral distribution of the light, but unlike the lens in the lamp of Figure 2 it does not distribute the light symmetrically, but throws it to the center and right side of the road only. This is accomplished by providing the lens with half flutes. The half flutes at the top and bottom of the lens are of greater curvature than those on the intermediate portion, giving greater spread. This is indicated by comparison of Figures 30 and 31. All of the half flutes are designed and arranged to render the beam insensitive at its left boundary to variations in filament position. In other words, while the lamp is already insensitive to changes in filament positioning to the extent that the proper degree of tilt between beams and satisfactory distribution of light in the beam is obtained even though the filament be as much as .060" out of position, vertically and axially,—this being accomplished by the reflector design previously described,— by proper design of the half flutes we have succeeded in causing the left side of the beam to terminate in a substantially vertical plane through the reflector axis regardless of variation in filament position in any direction within the same limits. This is important in that it enables the headlamp adjuster at the service station to properly aim the lamp sidewise by merely adjusting the headlamp faces to a straight edge.

In order to do this it is necessary to choose for this boundary, light from portions of the reflector which are insensitive to errors in positioning of the filaments. As regards lateral insensitivity a study of the paraboloid will reveal that the most sensitive zone is a vertical central zone through the reflector corresponding to intermediate zone 2 rotated through 90°. The most sensitive part of this zone is the center. A little reflection will make it apparent that when considered from the standpoint of lateral shift of rays in response to changes in position of the light source a paraboloidal reflector may be laid off into zones of varying sensitivity which if rotated through 90° will exactly coincide with zones of varying sensitivity with respect to vertical shift of rays.

We have applied this principle in the design of the half flutes as shown in Figures 30 and 31. We have chosen for the left boundary of our beams rays of light from the extreme side portions of the reflector. The flutes over these portions of the reflector are designed with little or no prismatic action at their left extremities. The prismatic action at the left side of the half flutes increases as the vertical center line of the lamp is approached. As a consequence, going from the side of the lamp to the center line, the left-most ray of each successive flute is thrown a little more to the right, providing a tolerance so that even if the filament is .060" out of position, still no ray will pass to the left of the vertical center line of the lamp.

This result is accomplished by the design of half flutes shown in Figures 30 and 31. The principle of the design is illustrated in Figure 32. Considering the full flute 42 it will be noted that a ray 44 passing through the glass on the center line of the flute is unchanged in direction for at this point the opposite faces of the glass are parallel. Rays 46 striking the glass to the right of the center line are directed to the right. The greater the distance from the center line, the greater the degree of bending. If it is desired that the leftmost ray from the half flute shall be directed straight ahead the center line of the flute should be its left boundary. If it is desired that the leftmost ray from a half flute should be directed to the right, the half flute should terminate to the right of the center line. The farther to the right one wants the leftmost ray to go, the farther to the right of the center line should the left boundary of the half flute be. Conversely if it is desired that the leftmost ray from the flute should go to the left of the center line, the left boundary of the flute should extend to the left of the center line. A flute which extends on both sides of the center line but is unsymmetrical we have arbitrarily termed a ¾ flute. We have used the term fractional flute to cover anything less than a full flute.

In Figures 30 and 31 the distance from the left boundary line of the half flute to the flute center line indicated at F increases as the vertical center line of the lamp is approached. One method of determining the amount of this increase is to design the flutes so that the leftmost ray from each flute is parallel with the longitudinal center line of the car when the filament is displaced 0.060" in any direction.

This effect is modified by variation in radius of curvature of the flutes in different parts of the lens to get the desired distribution of light in the beam.

We have chosen to use concave half flutes for the reason that with this shape the side of the flute that determines the left margin of the beam can be more accurately molded than with convex flutes. This is illustrated in Figure 33. Here we have shown a portion of a plunger 48 forming concave half flutes in a glass blank 50. The bottoms of the half flutes are formed by the projection of the plunger into the glass, while the tops are formed by the forced flow of the glass into the recesses in the plunger. A sharper corner is obtained by the impress of the plunger than by the flow of the glass into the recess. The more accurately formed corners produce the left margin of the beam as previously explained. Figure 34 shows that the reverse is true in the case of convex half flutes for the more accurately formed corners determine the right margin of the beam. The use of concave half flutes therefore results in better control of the left boundary of the beam pattern.

A half flute really consists of a full flute plus a prism. This is made clear in Figures 35 and 36 which are composite lenses consisting of full fluted pieces of glass 52, and 52', laid on prismatic or angled pieces of glass 54, and 54' respectively. The resulting positions of the flutes are such as to convert them into a series of half flutes when referred to the common plane of the prismatic pieces. The optical characteristics of Figures 35 and 36 are identical with those of Figure 30. This study of half flutes makes it clear that the same results optically may be accomplished by the modification shown in Figures 37 and 38. Here the prisms 56, 56' and flutes 58, 58' are on opposite sides of the lens, giving the usual smooth appearance to the fluted face of the lens.

Other modifications will occur to those skilled in the art.

In Figures 40, 42 and 44 we have shown the beam patterns projected by the filaments of the left headlamp. It will be remembered that these filaments are arranged in inverse order with respect to their arrangement in the right headlamp.

The beam pattern of Figure 40 is produced by the intermediate filament 8.

The beam pattern of Figure 42 is produced by the upper inclined filament 14.

The beam pattern of Figure 44 is produced by the filament 12, arranged below focus.

All of these beams are obtained with the bulb fixedly mounted in the headlamp, the beams being vertically and laterally insensitive to .060" movement of the filament in any direction from its correct position in the reflector.

In Figures 45 to 49 we have shown the beams produced by the two headlamps in the combinations in which we prefer to employ them.

Figure 45 is the city upper driving beam pattern. It is produced by the intermediate filaments of the two headlamps. The beam pattern is produced by superposing the pattern of Figure 40 upon the pattern of Figure 39. This beam will be used for city driving, but in passing the beam next to be described will be used.

Figure 47 is the city lower driving beam pattern. It is produced by the upper filaments of the two headlamps. The beam pattern is produced by superposing the pattern of Figure 42 upon the pattern of Figure 41. It will be noted that this beam is slightly asymmetrical in that it is lower on the left side than on the right side. This results from the fact that the upper filament of the left headlamp is the angled filament 14 which, as previously described, has an effective spacing of $\frac{1}{16}$" from the intermediate filament 8, while the upper filament 12 of the right headlamp is a conventional V-shaped filament spaced $\frac{1}{8}$" above the intermediate filament. The greater the spacing of the upper filament from the intermediate filament the greater the drop in the beam upon going to the upper filament.

Figure 48 is the country upper beam pattern. It is produced by the intermediate filaments of both headlamps with the addition of the lower angled filament 14 of the right headlamp. The beam pattern is produced by superposing the beam patterns of Figures 39, 40 and 43, or superposing the beam pattern of Figure 43 upon the beam pattern of Figure 45. This beam will be used for driving at high speeds in the country. The addition of filament 14 gives greater intensity and also puts the light way down the road where it is needed for fast driving. Here the provision of an effective spacing of $\frac{1}{16}$" between the angled filament 14 and the intermediate filament 8 is again of advantage. If greater spacing were employed, some of the light from the angled filament would be thrown at too high an angle and would separate from the main beam giving unsatisfactory lighting. At present it is illegal in a number of States but it is our belief that the increase in automobile speeds will force a change in State requirements in the interests of safety.

Figure 46 is the country lower beam pattern. It is produced by the upper filaments of the two headlamps with the addition of the intermediate filament of the left headlamp. The beam pattern is produced by superposing the beam patterns of Figures 40, 41 and 42, or superposing the beam pattern of Figure 40 upon the beam pattern of Figure 47. This beam will be used for passing an approaching car in the country. The addition of filament 8 of the left headlamp gives greater intensity at the center and right side of the road where it is needed in passing and also throws light a considerable distance down the road. The beam is low on the left side, safeguarding the driver of the approaching car from glare.

In Figure 49 we have shown an alternate form of country upper beam pattern. It is produced by the intermediate filaments and the lower filaments of both headlamps. The pattern is produced by superposing the beam patterns of Figures 39, 40, 43 and 44, or by superposing the beam pattern of Figure 44 upon the pattern of Figure 48. While the filaments may be energized in other combinations, we believe the above will give the best results in illumination with the least drain on the battery.

In Figures 50 and 51 we have illustrated a lighting circuit which may be used to produce the beam patterns just described, and has certain advantages from the standpoint of convenience to the driver and economy of manufacture. In Figure 50 current from the battery 60 is supplied to selector switch 62 having two conducting arms 64 and 66 and two insulated arms bearing bridging contacts 68 and 70 respectively. The selector switch is shown in position to permit use of either of the city driving beams. Current from the battery 60 passes through switch arm 64 and lead 72 to foot switch 74. In the position shown the foot switch 74 permits current to flow through leads 76 and 78 to the upper filaments of the two headlamps producing the city lower beam, the pattern of which is shown in Figure 47.

By moving the foot switch 74 to its dotted line position current is supplied through leads 80 and 82 to the center filaments of the two headlamps, producing the city upper beam, the pattern of which is shown in Figure 45.

In Figure 51 we have shown the selector switch 62 in its next position permitting use of either of the country driving beams. In this position use is made of an automatic switch 84 operated by the steering mechanism of the car by any suitable mechanical connection to the steering shaft or other part of the steering gear or by a centrifugal device so adjusted that the switch will be open when the car is making a right turn and closed at all other times. It will be noted that in the position shown current passes in substantially the same manner as before from the battery 60 through the selector switch arm 64, leads 75 and 72, foot switch 74, and leads 76 and 78 to the upper filaments of the headlamps. Current also passes through leads 75 and 86, bridging contact 70, lead 88, automatic switch 84, and leads 88 and 82 to the left filament 8. This produced the country lower beam, the pattern of which is shown in Figure 46. When the car is making a right turn the automatic switch cuts out the left center filament thereby minimizing glare in the eyes of drivers approaching from the right on the cross road.

By moving the foot switch 74 to its dotted line position current is supplied through lead 80 to the intermediate filament of the right headlamp through leads 80 and 90, bridging contact 68, and lead 92 to the lower filament of the right headlamp; and through lead 82 to the intermediate filament of the left headlamp, producing the country upper beam, the pattern of which is shown in Figure 48.

In both positions of the selector switch it will be noted that the tail light 94 is energized, being supplied with current through selector switch arm 66, as shown. In other positions of the selector switch the side lamps 96 are energized in an obvious manner.

In states where the country upper beam is illegal, the lead to the lower filament of the right headlamp may be disconnected or the corresponding contact may be removed from the selector switch so as to make it impossible to energize this filament and project light above the horizontal. This will take care of the transition period during which modification of the headlight laws may be expected to take place.

In the circuits shown in Figures 50 and 51 we have also made use of a pilot lamp 98 which is mounted on the instrument panel of the car in such a position as to be visible to the driver. It is supplied with current by lead 90 which supplies the right intermediate filament causing it to light when that filament is lighted thus indicating to the driver that the city or country upper beam is turned on.

In the foregoing figures, 50 and 51, we have shown what we term a four-beam circuit, there being an upper and lower beam for city use and a different upper and lower beam for country use. Other combinations employing four beams may be used and the switching devices may be modified both in construction and in arrangement. If desired, the switching arrangement may be modified to provide more than four beams or less than four.

We have experimented with a three-beam circuit which we have shown diagrammatically in Figure 52. Current is supplied from battery 60 to switch 100, which in the position shown supplies current through leads 102 and 104 to the intermediate filaments of both headlamps and through lead 106 to the lower filament of the right headlamp, producing the country upper beam shown in Figure 48.

By rotating the switch one point to the right, current is supplied to the two intermediate filaments only, producing the beam shown in Figure 45 which may be used for a country lower beam or a city upper beam.

By rotating the switch two points to the right current is supplied through lead 104 to the left intermediate filament, through lead 108 to the left upper filament and through lead 110 to the right upper filament, producing the lower beam shown in Figure 46.

In all three positions the tail lamp 94 is lighted. The switch may be turned one point to the left to turn off all of the lights, and two points to the left to turn on the tail lamp 94 and parking lamps 96.

We have also provided for the alteration of electrical circuits on cars now in service thus permitting them to benefit from some of the advantages of our system. Two forms of such alteration we have shown diagrammatically in Figures 53 and 54.

In Figure 53 we have shown a circuit which may be employed to convert a present day two beam system to a system embodying our invention in which one of the beams is asymmetrical. To accomplish this the left headlamp is equipped with a special lens such as shown in Figures 28 to 31. It is also equipped with a special reflector and socket assembly differing from that previously used in that there is built into it, in any suitable manner, a relay 112. Both headlamps are likewise provided with our preferred form of three filament bulbs in place of the two filament bulbs formerly used. A new wiring harness will also be necessary. The usual foot switch 74 and instrument panel or steering column switch 114 may be used without alteration.

The relay 112 consists of an electromagnet which is energized when the left upper filament 14 is lighted, thereby attracting armature 116 in series with the intermediate filament, and causing it to engage contact 118, energizing the left intermediate filament 8. When the left upper filament 14 is not lighted the armature 116 is retracted by spring 122 and engages contact 120. The left intermediate filament may then be independently energized by manipulating the foot switch 74.

In the position of the parts shown in Figure 53, current is supplied from battery 60 through switch 114, lead 124, to foot switch 74, leads 125 and 126 to the upper filaments of both headlamps and to the intermediate filament of the left headlamp through the action of relay 112, producing the lower beam shown in Figure 46.

By moving the foot switch 74 to its dotted line position current is supplied to the two center filaments, producing the upper beam, shown in Figure 45.

Another simpler method of incorporating the asymmetrical feature into present day two beam headlighting equipment is to remove the lens and bulb from the left headlamp, equipping it with the lens shown in Figures 28 to 31 and with the bulb shown in Figures 25 to 27, the bulb being positioned with the angled filament at the top. This provides the city upper and lower beams. No change in wiring is necessary. However, if it is desired to burn two filaments in the left headlamp simultaneously to get the country lower beam, it will be necessary either to provide a relay as just described, or modify the wiring and switch arrangement.

In Figure 54 we have shown a four beam system which requires the same alterations as those described in connection with Figure 53 with the additional feature that the foot switch is replaced by a special instrument switch 126, which is shown in the correct position for country driving. The switch 126 is provided with opposed pairs of arms 138 and 144, the arms of each pair being in conducting relation, but insulated from the other pair.

In the position of parts shown in Figure 54, current is supplied from battery 60 through switch 114, leads 128, 130 and 132 to the upper filaments of the headlamps. The intermediate filament of the left headlamp is energized by the action of relay 112. This relay draws up its armature 118 causing it to engage contact 134 which is connected by lead 136 to the pair of contact arms 138 of switch 126, the contact arms being supplied with current by lead 128.

By moving switch 114 one step to the right current is supplied through leads 140 and 142, arms 144 of switch 126, and lead 146 to the lower filament of the right headlamp. At the same time current is supplied through leads 140, 141 and 143 to the intermediate filament of the right headlamp and through leads 140, 141, 145, contact 120 and armature 116 to the intermediate filament of the left headlamp. The resulting beam is shown in Figure 48.

By moving switch 126 to its off position, shown by dotted lines, the city driving beams may be obtained. With switch 114 in the position shown current is supplied to the upper filaments of the headlamps in the manner just described, producing the lower beam, shown in Figure 47. With the switch 114 rotating one point to the right the intermediate filaments of both lamps are energized, producing the city upper beam, shown in Figure 45. The circuits disclosed in Figures 50, 51, 53 and 54 are described and claimed in our divisional application S. N. 664,194 filed April 3, 1933.

We have previously described the headlamp shown in Figure 3 as an alternative form for use on the right. We have illustrated in Figures 55 to 60 the corresponding lens that may be employed in the left headlamp in combination with a simple paraboloidal reflector. The two headlamps together will produce the patterns just described.

The lens of Figures 55 to 60 is provided with half-flutes 170 and 172 which may be of the same design as those on the lens shown in Figures 28 to 31 to provide asymmetrical distribution and lateral insensitivity. The lens is also provided with down-bending prisms 174 on the top and bottom portions 1 and 3, with weaker down-bending prisms 176 on the intermediate portion 2 as in the case of the lens of Figure 3. If desired, the sides of the intermediate portion may be provided with still weaker down-bending prisms 178 so that the top rays of the beam will be projected slightly below horizontal. The same result may be accomplished without prisms on the sides by tilting the whole reflector down or aiming the lamp down.

Optically the modification shown in Figures 55 to 60 is the equivalent of that shown in Figures 28 to 31 but possesses the advantage that it permits the use of a simple paraboloidal reflector, which is cheaper and easier to make than the distorted reflector of Figure 28.

Our system may also be embodied in headlamps in which the lateral spread is accomplished by fluting the reflector instead of providing flutes on the lens. With this design the "lens" may consist of plain window glass. In Figures 61 to 64 we have shown a reflector of this construction for use on the left side of the car. A reflector of this design for use on the right side of the car would be identical with that disclosed in Figure 2 except that it would be provided with vertical flutes of the type disclosed in the Brown Patent No. 1,546,281, to give symmetrical lateral spread to the rays.

The reflector shown in Figures 61 to 64 is of the same design as that shown in Fig. 2 except that half flutes 180 are employed. These flutes are shaped to perform the same functions as the flutes in the lens described in detail in connection with the preferred form of our invention. Thus the flutes nearer the center of the lamp are designed with cutoffs farther to the right of the flute centerline so as to give lateral insensitivity. The flutes at top and bottom are wider as shown to give greater lateral spread to the rays from these portions. The same results may be accomplished by giving greater or less transverse curvature to the flutes. The resulting light patterns will be the same as those described.

In the form first described we obtained the asymmetrical beam for lighting the center and right hand side of the road from the left headlamp. If desired the asymmetrical beam may be projected from the right headlamp while the left headlamp projects the symmetrical beam. We have found this arrangement to be less satisfactory, however, for the reason that the left side of the hot spot must be aimed substantially straight ahead in order not to be directed into the eyes of an approaching driver at a distance of several hundred feet ahead. This serves to move the illuminated road surface to the right by an amount equal to the distance between headlamps unless three-quarter flutes are provided over the upper and lower zones and in such case the fixed-focus properties suffer as previously described.

It is obvious that, in all of the forms so far described, by providing the upper and lower zones of the left headlamp with full flutes instead of half flutes, the corresponding light rays will be given a symmetrical lateral spread, and the hot spot at the top of the beam produced by rays from the intermediate zone will alone be concentrated on the center and right side of the road. Such design may be further modified by making the right headlamp a counterpart of the left except that the intermediate zone is provided with half-flutes arranged to throw the light to the center and left side only of the roadway. The two beams with their hot spots criss-crossed as described will then unite to form an apparently symmetrical high beam, and by depressing the beam projected from the right headlamp, an unsymmetrical passing beam may be obtained. An objection to such designs is that it will prove difficult to make an effective fixed-focus lamp of such construction because some of the light from the top and bottom segments comes to the top of the pattern in some of the out of focus filament positions, thereby permitting light to be directed to too high a level on the left side of the passing beam in the case of at least a percentage of the headlamps produced.

In Figures 65 to 67 we have shown a modified type of headlamp for use in producing a beam with criss-crossed hot spots as just described.

In Figures 68 and 69 we have shown the corresponding beams and beam patterns while in Figures 70 to 75 we have shown the beam patterns for the right and left lamps respectively.

In Figure 65, 182 represents a reflector which may be of the same design as that shown in Figure 2. This reflector is provided with a three filament bulb of the type shown in Figures 16 to 18. The center filament 8' is on focus while the filaments 12' and 14' are above and below focus, respectively. The filament 14' is spaced but slightly below the filament 8' so as to obtain an overlapping of beam patterns. The spacing is preferably $\tfrac{1}{16}''$. The lamp is equipped with a lens 186, the top and bottom of the lens as indicated in Figures 66 and 67, are provided with full flutes 188. The intermediate section of the lens is provided with half flutes designed for lateral insensitivity. These half flutes may be of the construction shown in Figures 29 to 31.

The right and left headlamps will be identical except that the lens in one headlamp will have the half flutes on the intermediate section facing in the opposite direction with respect to the half flutes of the other headlamp. This may be accomplished without having rights and lefts by simply turning one lens around with respect to the other, either by rotating it 180° about a vertical axis or 180° about a horizontal axis, passing through the center of the lens. The bulbs will, of course, have reversed positions in the two headlamps as in the preferred form of the invention. In Figure 65 we have illustrated the bulb arrangement for the left headlamp.

We have indicated the hot spot of the beam from the left headlamp at 190 and the hot spot from the right headlamp at 192. It will be apparent that by combining the beams produced by the same filaments of the two headlamps a symmetrical beam will be produced having a hot spot of double width, the hot spots 190 and 192 overlapping slightly at the center. By leaving the left lamp unchanged, and going to the upper filament in the right lamp, a combination is obtained in which the hot spot 192 on the left side of the road is dropped while the hot spot 190 remains in elevated position. This provides a passing beam. By suitable switching arrangements any other desired combination of beams may be obtained.

We have also experimented with combinations of two asymmetrical headlamps, each casting a beam such as those shown in Figures 40, 42, and 44, except that the patterns are rights and lefts and overlap in the center. This may be accomplished by employing two lamps of the construction shown in Figures 28 to 31 but with the half flutes in the two lamps facing in opposite directions. Or it may be accomplished by employing the lens shown in Figures 55 to 59 in combination with a parabolic reflector but with the half flutes facing in opposite directions in opposite lamps. Here again the same lens may be used interchangeable in the two lamps by positioning it in one lamp with the half flutes facing in one direction, and in the other lamp with the half flutes facing in the opposite direction. However, if the lens is of the type employing horizontal prisms, care must be taken to see that the prisms are maintained horizontal in both lamps.

In checking this combination it is preferable that the beams be crossed, the right headlamp lighting the center and left side of the road and vice versa, although each headlamp may illuminate its own portion of the road if preferred.

An advantage arising from the use of two asymmetrical beams as just described is that when a filament burns out it is noticeable to the driver since then only one side of the road is lighted. An objection to this system arises from the fact that to get a symmetrical upper beam of increased candle power for country driving, it will be found necessary to burn four filaments, increasing the drain on the electrical system. Where, with this system, each headlamp lights its own side of the road, it will be found desirable to employ three quarter flutes to give sufficient light down the center of the road and avoid a dark streak between the two asymmetrical beams.

We have illustrated in Figures 76 and 77 another method of obtaining the desired asymmetrical passing beam. According to this method one or both of the headlamps is provided with a reflector 194 whose axis is inclined toward the car centerline so that the beams of light from the two headlamps cross each other. The reflector may be cut off in a plane at right angles to the car centerline as shown and fitted within the conventional lamp housing 196 the axis of which is parallel to that of the car, thereby giving the desired symmetry of appearance to the headlamps. In vertical section the reflector may be of the design shown in Fig. 2, and it may be equipped with any one of the types of bulb herein described. We have illustrated the lamp as provided with a simple spreading lens having flutes of small radius of curvature so as to concentrate the light in the asymmetric beams. This arrangement while permitting the use of the same lens in both headlamps, does not give a concentrated hot spot at the top of the beam. It is also somewhat costly to cut the reflector at an angle and this also makes it more difficult to produce accurate reflectors. It is believed to be much simpler and better to use half or three quarter flutes to accomplish the desired sidewise directing of the rays. However, it will be obvious that by dropping the beam from one headlamp an asymmetrical passing beam is obtained.

Another method of obtaining an asymmetrical passing beam is to use an auxiliary driving lamp to provide that part of the hot spot which is to be tilted or shifted. In this case the tilting of the beam from the auxiliary lamp can be done either by shifting from one filament to another as in the preferred system or by mechanically changing the aim of the lamp. One advantage of this system is that the light from the auxiliary lamp instead of being depressed, could easily be shifted to the right side of the road where it is most useful and can be aimed relatively high without causing glare. An objection to the system is that it necessitates the use of three lamps and would be correspondingly high in cost. It would also complicate the problem of adjusting the lamps in the service stations.

It will be understood that many of the terms as used herein are to be taken in a relative sense. Thus where we refer to the horizontal as the reference plane above which rays should not pass to avoid glare, it is to be understood we do not have in mind the strict geometrical definition of the term, but the angle, whatever it may be, that is accepted as the limit of elevation for non-glaring rays.

It is to be understood that the terms "right" and "left" apply only in the sense that the rule of the road is to the right and would be reversed in sense if such rule were reversed.

It is also obvious that where we have referred to the employment of two light sources in a single lamp an equivalent result may be obtained by the use of a single shiftable source.

We claim:

1. A pair of headlamps adapted to be mounted at the front of a vehicle and to light the roadway, one of said headlamps comprising light projecting means including a concave light-concentrating reflector and a glass closure, means providing a source of light adjacent the focal region of the reflector or at a point above the focal region, said light projecting means being subdivided into upper, intermediate and lower transversely extending superimposed zones, the rays of light from said upper and lower zones being but slightly affected by shifting from one source to the other while the rays of light from said intermediate zone are shifted sharply downwardly upon energizing the upper source, said upper and lower zones being formed to direct the rays falling upon them beneath the top of the beam produced when the lower source is energized, whereby, upon changing to the upper source, an effective lowering of the beam is secured, said light projecting means having vertically extending symmetrical flutes to spread the light across substantially the full width of the roadway; the other headlamp comprising light projecting means including a concave light-concentrating reflector, a glass closure, and a light source adjacent the focal region of the reflector, said light projecting means having vertically extending unsymmetrical flutes arranged to spread light over the right side of the roadway only, means for energizing said last-named light source simultaneously with one or the other of the first named sources, the energization of the second-named focal source together with the first-named focal source producing a substantially symmetrical beam of greater intensity on the right side than on the left, and the energization of the second named focal source together with the source above focus producing an asymmetrical beam of greater intensity and higher on the right side than on the left for use as a passing beam.

2. A pair of headlamps adapted to be mounted at the front of a vehicle to light the roadway, one of said headlamps comprising light projecting means including a concave light-concentrating reflector and a glass closure, means providing a source of light adjacent the focal region of the reflector or at a point above the focal region, said light projecting means being subdivided into upper, intermediate and lower transversely extending superimposed zones, the rays of light from said upper and lower zones being but slightly affected by shifting from one source to the other while the rays of light from said intermediate zone are shifted sharply downwardly upon energizing the upper source, said upper and lower zones being formed to direct the rays falling upon them beneath the top of the beam produced when the lower source is energized, whereby, upon changing to the upper source, an effective lowering of the beam is secured, said intermediate zone being provided with means for directing light to form the left half of the upper portion of the combined high beam produced by the two lamps, the other headlamp comprising light projecting means including a concave light-concentrating reflector, a glass closure, and a light source adjacent the focal region of the reflector, said light projecting means including means for directing light into the right half only of the upper portion of the combined beam pattern, means for energizing said last-named light source simultaneously with one or the other of the first-named sources, the energization of the second-named focal source together with the first-named focal source producing a substantially symmetrical beam, and the energization of the second-named focal source together with the source above focus producing an asymmetrical beam higher on one side than on the other for use as a passing beam.

3. A pair of headlamps adapted to be mounted at the front of the vehicle to light the roadway, each of said headlamps comprising light projecting means arranged to project light in the form of a laterally elongated beam, one pair of beams of the two headlamps combining to produce a substantially symmetrical high beam illuminating the full width of the roadway, one of said light projecting means being arranged to project rays into the right half of the upper part of the combined high beam, the other of said light projecting means being arranged to project substantially all of the rays forming approximately the left half of the upper part of the combined high beam, said last-named light projecting means being constructed to provide an alternate beam in which the last-mentioned rays are directed into the remainder of the body of the combined beam, and means for manipulating said last-named light projecting means to produce said alternate form of beam so as to obtain in combination with the beam from the other headlamp a beam lower on the left side than on the right for passing.

4. A pair of headlamps adapted to be mounted at the front of the vehicle on either side thereof to light the roadway, each of said headlamps comprising light projecting means arranged to project light in the form of a laterally elongated beam, one pair of beams of the two headlamps combining to produce a substantially symmetrical high beam illuminating the full width of the roadway, the light projecting means of the left headlamp being arranged to project rays into the right half of the upper part of the combined high beam, the light projecting means of the right headlamp being arranged to project substantially all of the rays forming approximately the left half of the upper part of the combined high beam, said last-named light projecting means being constructed to provide an alternate beam in which the last mentioned rays are directed into the remainder of the body of the combined beam, and means for manipulating said last-named light projecting means to produce said alternate form of beam so as to obtain in combination with the beam from the other headlamp a beam lower on the left side than on the right for passing.

5. A pair of headlamps adapted to be mounted at the front of the vehicle to light the roadway, each of said headlamps comprising light projecting means arranged to project either a high beam, or a low beam, means for manipulating the said light projecting means of the two headlamps to provide either two high beams, said beams combining to produce a substantially symmetrical high beam, or two low beams, said beams combining to produce a substantially symmetrical low beam, or one high beam and one low beam, said beams combining to produce an asymmetrical passing beam, one of said light projecting means being arranged to project rays into the right half of the upper part of the combined high beam, the other of said light projecting means being arranged to project substantially all of the rays forming approximately the left half of the upper part of the combined beam, so that when the high beam of the first named light projecting means is combined with the low beam of the second-named light projecting means an asymmetrical passing beam is obtained lower on the left side than on the right.

6. A pair of headlamps adapted to be mounted at the front of a vehicle and on either side thereof to light the roadway, each of said headlamps comprising light projecting means including a concave light-concentrating reflector and a glass closure, the light projecting means of one of said headlamps being provided with a source of light adjacent the focal region and with light deflecting members arranged to spread light over one side only of the width of the roadway, the light projecting means of the other headlamp being provided with a source of light above focus and being subdivided into upper, intermediate and lower transversely extending superimposed zones, the rays of light from the upper and lower zones being but slightly affected by going to a source above focus while the rays of light from the intermediate zone are shifted sharply downwardly, said upper and lower zones being formed to direct the rays falling upon them beneath the top of the beam produced when a source is provided adjacent the focal region so that upon energization of the above-focus source a lower beam is secured, said light projecting means being provided with light-deflecting elements spreading light across substantially the full width of the roadway, whereby when the light sources of both lamps are energized an asymmetrical beam is produced higher and of greater intensity on the right side than on the left.

7. A pair of headlamps adapted to be mounted at the front of the vehicle to light the roadway, each of said head-lamps comprising light projecting means provided with similarly located light sources and arranged to project light in the form of a laterally elongated beam, one of said light projecting means being arranged to project rays into the right half of the upper part of the combined high beam, the other light projecting means being arranged to project substantially all of the rays forming approximately the left half of the upper part of the combined high beam, the light source of the first mentioned light projecting means being of greater vertical extent than the light source of the second-mentioned light projecting means to produce a combined beam higher on the right side than on the left.

8. In the combination as defined in claim 3, one of said light projecting means including means for spreading light forming the lower part of its beam across substantially the full width of the roadway.

9. In the combination as defined in claim 2, each of said light projecting means including means for spreading light forming the lower part of the beam across substantially the full width of the roadway.

10. A pair of headlamps adapted to be mounted at the front of a vehicle to light the roadway, each of said headlamps comprising light projecting means including a concave light-concentrating reflector and a glass closure, and means providing a source of light adjacent the focal region of the reflector or at a point above the focal region, each of said light projecting means being subdivided into upper, intermediate and lower transversely extending superimposed zones, the rays of light from said upper and lower zones being but slightly affected by shifting from one source to the other while the rays of light from said intermediate zone are shifted sharply downwardly upon energizing the upper source, said upper and lower zones being formed to direct the rays falling upon them beneath the top of the beam produced when the lower source is energized, whereby, upon changing to the upper source, an effective lowering of the beam is secured, the intermediate zone of one of said lamps being provided with means for directing light to form the left half of the upper portion of the combined high beam produced by the two lamps, the intermediate zone of the second lamp being provided with means for directing light into the right half only of the upper portion of the combined beam pattern, means for energizing both focal sources to produce a high beam, means for energizing both sources above focus for producing a low beam, and means for energizing the focal source of the first mentioned lamp in combination with the above focus source of the second lamp to produce a composite beam higher on the right side than on the left.

ROBERT N. FALGE.
CHARLES E. GODLEY.